(12) United States Patent
Erlanger

(10) Patent No.: US 7,742,966 B2
(45) Date of Patent: *Jun. 22, 2010

(54) EFFICIENT MARKET FOR FINANCIAL PRODUCTS

(75) Inventor: Michael David Erlanger, Westport, CT (US)

(73) Assignee: Marketcore.com, Inc., Stamford, CT (US)

( * ) Notice: Subject to any disclaimer, the term of this patent is extended or adjusted under 35 U.S.C. 154(b) by 842 days.

This patent is subject to a terminal disclaimer.

(21) Appl. No.: 09/370,619

(22) Filed: Aug. 7, 1999

(65) Prior Publication Data

US 2003/0055778 A1    Mar. 20, 2003

Related U.S. Application Data

(63) Continuation-in-part of application No. 09/178,400, filed on Oct. 24, 1998, now abandoned, and a continuation-in-part of application No. 09/296,573, filed on Apr. 22, 1999, now Pat. No. 6,594,635.

(51) Int. Cl.
G06Q 40/00 (2006.01)
G06Q 30/00 (2006.01)

(52) U.S. Cl. ............... 705/37; 705/1; 705/4; 705/14.1; 705/14.25; 705/35; 705/38

(58) Field of Classification Search ............ 705/35–40, 705/402, 14, 4, 26, 27, 1, 30, 2, 42, 3, 14.1, 705/14.25
See application file for complete search history.

(56) References Cited

U.S. PATENT DOCUMENTS 4,677,552 A    6/1987    Sibley ..................... 364/408

(Continued)

FOREIGN PATENT DOCUMENTS

EP    0 434 224    6/1991

(Continued)

OTHER PUBLICATIONS

IMEX Mortgage Exchange "IMX Technology Solutions for Mortage Industry", Feb. 1999.*

(Continued)

*Primary Examiner*—James P Trammell
*Assistant Examiner*—Daniel L Greene, Jr.
(74) *Attorney, Agent, or Firm*—St. Onge Steward Johnston & Reens LLC

(57) ABSTRACT

A method of intermediation services providing an efficient market for a class of financial products in which transactions occur in distinct origination and secondary sectors, the method including outputting a pricing schedule providing credits for transactions fees paid in one sector for redemption against the transaction fees for the other. An embodiment includes offering information, captured in the course of providing intermediation services, at prices that are reduced as transaction fees increase. The method of the invention provides an efficient market for the provisioning of financial products that not only invites lenders, loan seekers, loan traders, offerors of lines of credit, seekers of lines of credit, traders of lines of credit, insurers, insurance seekers, and reinsurers to patronize a system employing the method, but which has conventions that induce them to patronize the system employing the method. The invention further contemplates the system employing the method.

85 Claims, 4 Drawing Sheets

U.S. PATENT DOCUMENTS

| | | | | |
|---|---|---|---|---|
| 4,750,119 A | * | 6/1988 | Cohen et al. | 705/14 |
| 4,903,201 A | | 2/1990 | Wagner | 705/37 |
| 4,980,826 A | | 12/1990 | Wagner | 705/37 |
| 5,034,916 A | | 7/1991 | Ordish | 709/204 |
| 5,077,665 A | | 12/1991 | Silverman | 705/37 |
| 5,101,353 A | | 3/1992 | Lupien | 705/37 |
| 5,193,056 A | | 3/1993 | Boes | 705/36 R |
| 5,297,032 A | | 3/1994 | Trojan | 705/37 |
| 5,327,508 A | | 7/1994 | Deaton | 382/100 |
| 5,375,055 A | | 12/1994 | Togher | 705/37 |
| 5,444,630 A | * | 8/1995 | Dlugos | 705/402 |
| 5,508,913 A | | 4/1996 | Yamamoto | 705/37 |
| 5,611,052 A | | 3/1997 | Dykstra | 705/38 |
| 5,636,117 A | * | 6/1997 | Rothstein | 705/38 |
| 5,644,726 A | | 7/1997 | Oppenheimer | 705/36 R |
| 5,689,650 A | * | 11/1997 | McClelland et al. | 705/36 |
| 5,704,045 A | | 12/1997 | King | 705/35 |
| 5,742,775 A | | 4/1998 | King | 705/38 |
| 5,774,883 A | | 6/1998 | Anderson | 705/38 |
| 5,787,402 A | | 7/1998 | Potter | 705/37 |
| 5,794,207 A | | 8/1998 | Walker | 705/1 |
| 5,794,219 A | | 8/1998 | Brown | 705/37 |
| 5,806,048 A | | 9/1998 | Kiron | 705/36 R |
| 5,809,478 A | | 9/1998 | Greco | 705/4 |
| 5,809,483 A | | 9/1998 | Broka | 705/37 |
| 5,835,896 A | | 11/1998 | Fisher | 705/37 |
| 5,845,265 A | | 12/1998 | Woolston | 705/37 |
| 5,845,266 A | | 12/1998 | Lupien | 705/36 R |
| 5,873,071 A | | 2/1999 | Ferstenberg | 705/36 R |
| 5,878,403 A | | 3/1999 | DeFrancesco | 705/38 |
| 5,884,286 A | | 3/1999 | Daughtery | 705/36 R |
| 5,890,138 A | | 3/1999 | Godin | 705/26 |
| 5,893,079 A | | 4/1999 | Cwenar | 705/36 R |
| 5,895,454 A | | 4/1999 | Harrington | 705/35 |
| 5,903,882 A | * | 5/1999 | Asay et al. | 705/44 |
| 5,924,082 A | | 7/1999 | Silverman | 705/37 |
| 5,940,812 A | | 8/1999 | Tengel | 705/38 |
| 5,966,699 A | * | 10/1999 | Zandi | 705/38 |
| 5,966,700 A | * | 10/1999 | Gould et al. | 705/38 |
| 5,995,947 A | * | 11/1999 | Fraser et al. | 705/38 |
| 6,006,200 A | | 12/1999 | Boies | 705/26 |
| 6,006,207 A | * | 12/1999 | Mumick et al. | 705/38 |
| 6,026,364 A | | 2/2000 | Whitworth | 705/36 R |
| 6,029,141 A | | 2/2000 | Bezos | 705/27 |
| 6,049,782 A | * | 4/2000 | Gottesman et al. | 705/35 |
| 6,119,093 A | | 9/2000 | Walker | 705/4 |
| 6,233,566 B1 | | 5/2001 | Levine | 705/36 R |
| 6,272,528 B1 | * | 8/2001 | Cullen et al. | 705/36 R |
| 6,385,594 B1 | * | 5/2002 | Lebda et al. | 705/38 |
| 6,876,992 B1 | | 4/2005 | Sullivan | |
| 2004/0236698 A1 | | 11/2004 | Sweeney | |

FOREIGN PATENT DOCUMENTS

| | | |
|---|---|---|
| EP | 0 512 702 | 11/1992 |
| EP | 0 895 173 | 2/1999 |
| GB | 1 489 571 | 10/1977 |
| JP | 10-312437 | 11/1998 |
| WO | WO 95/27945 | 10/1995 |
| WO | WO 97/08640 | 3/1997 |
| WO | WO 97/30407 | 8/1997 |
| WO | WO 97/45802 | 12/1997 |
| WO | WO 99/09470 | 2/1999 |
| WO | WO 99/13425 | 3/1999 |

OTHER PUBLICATIONS

"Internet Mortgage Aggregators Multiply," American Banker Further Banking Supplement (Dec. 1, 1997).

"Lenders Turn to Aggregate Sites: Online Markets Start to Emerge," Credit Risk Management Report (Jun. 29, 1998).

Bower, Jeffrey E.: Credit Scoring and Artificial Intelligence, ABA Bank Compliance (Jul. 1, 1998) pp. 37-42.

E-Loan.com, selected web pages from www.eloan.com (Apr. 11, 1999).

Fesharaki, Fereidun et al., "Adjustment of Worldwide Refining Capacity is Not Over Yet," Oil & Gas J. (Apr. 20, 1987).

On-line Mortgage Trading System Debuts, Business Wired (Oct. 1, 1997).

The Gale Group, CFI ProServices Announces a New Software Product That Simplifies Fair Lending, pp. 1-3 (Jun. 1, 1994).

GetSmart.com, selected pages from www.getsmart.com (Apr. 11, 1999).

Goss, John: We know Who You Are and We Know Where You Live: The Instrumental Rationality of Geodemographic Systems, Economic Geography (Apr. 1995).

Homeadvisor.com, selected web pages from www.homeadvisor.com (Apr. 11, 1999).

Homeshark.com, selected pages from www.homeshark.com (Apr. 11, 1999).

IMX, "IMX Mortgage Exchange develops secure technology to connect brokers and lenders," ttp://corp.imx.com/corp/newsroom/press/97_10_01.asp (Oct. 1, 1997).

IMX (Industrywide Mortgage Exchange) "IMX Exchange Readies PowerTrade for Lenders," http://corp.imx.com/corp/newsroom/press/98_05_06.asp (May 6, 1998).

IMX Mortgage Exchange, "IMX Technology Solutions for Mortgage Industry" (undated).

Instinet: Instinet Trading, A Guide (1994).

Lendigtree.com, selected pages from www.lendingtree.com (Apr. 11, 1999).

Robert Mabro: Netback Pricing and the Oil Collapse of 1986, Oxford Institute for Energy Studies (1987).

Phillips Business Information, "Marketplace Profile: Network Vendor," Credit Risk Management Report (Jul. 27, 1998).

Meridien Research Inc., "Shifting Power to the Buy Side: Automating Fixed Income Markets" (Oct. 1999).

Mortgage.com, selected web pages from www.1stmtg.com (Apr. 11, 1999).

The Mortgage Professor's Website—The Different Types of Mortgage Web Sites, from www.mtgprofessor.com Jan. 11, 1999.

"The Mortgage Professor's Website—Summary Evaluation of Shopping Sites" and "Detailed Evaluation of Shopping Sites," from www.mtgprofessor.com, Nov. 17, 1998.

Muolo, Paul: "Farewell, Big Pond—Hello Startup," U.S. Banker vol. 108 No. 5 pp. 108-112 (May 1998).

"Netbacks Have Deeply Changed International Crude Oil Pricing," Notational Petroleum News (Jun. 1986).

Peters, Rich, "Risk-Based Pricing," Credit World (Mar. 1, 1993).

Priceline.com, selected pages from www.priceline.com (Apr. 11, 1999).

Quicken.com, selected pages from www.quicken.com (Apr. 11, 1999).

Reinbach, Andrew: The Bidding Wards: Mortgage Exchanges Force Commoditization, Bank Systems and Technology (Nov. 1996).

Tahmassebi, "Netback Deals Could Bring Some Stability to Oil Market," Oil & Gas J. (Jan. 20, 1996).

Wise, Christy, Three Strategies, Mortgage Banking (Apr. 1, 1998).

Robert Mabro: Netback Pricing and the Oil Collapse of 1986, Oxford Institute for Energy Studies (1987).

Instinet: Instinet Trading, A Guide (1994).

* cited by examiner

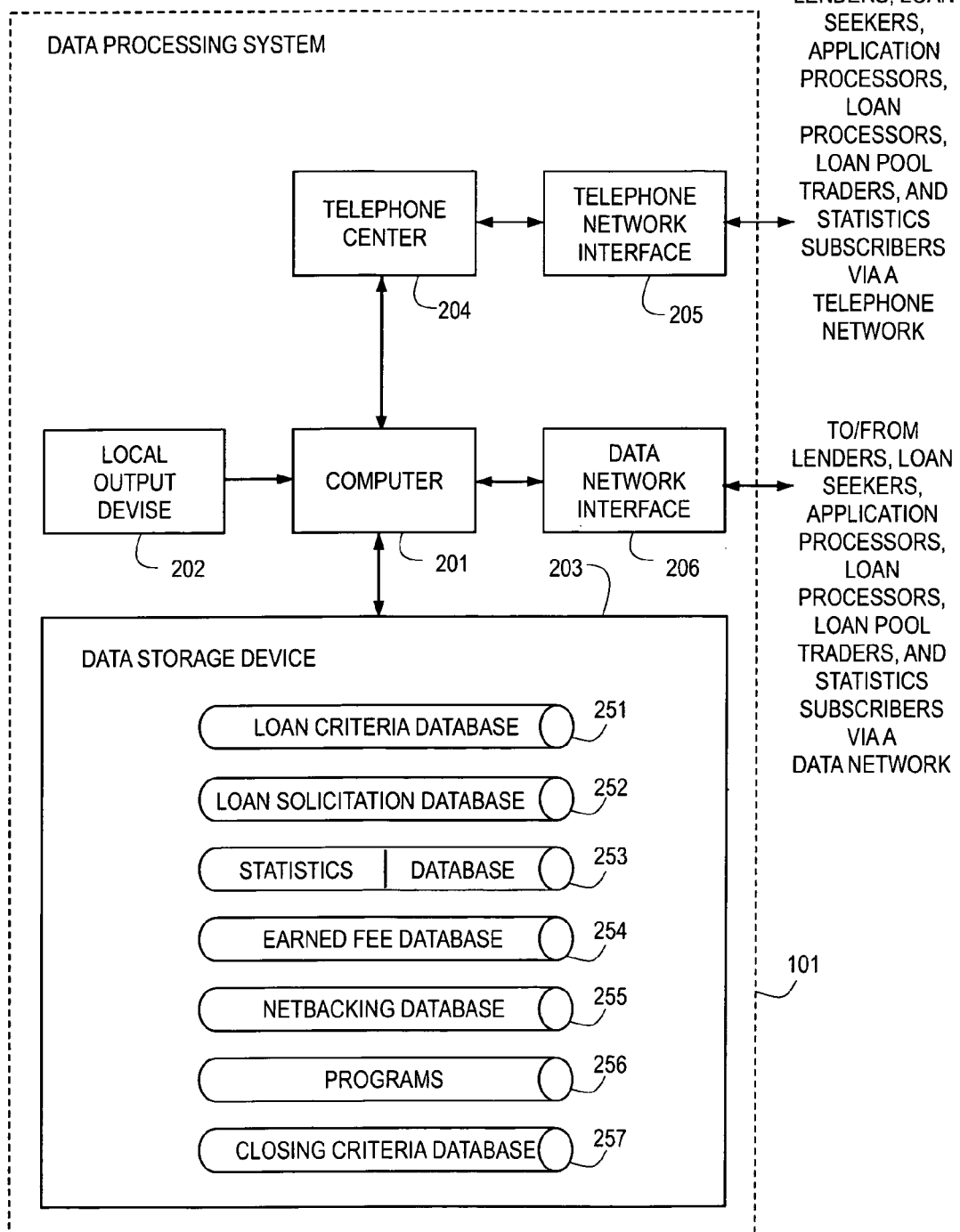

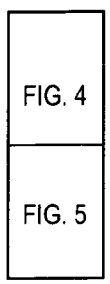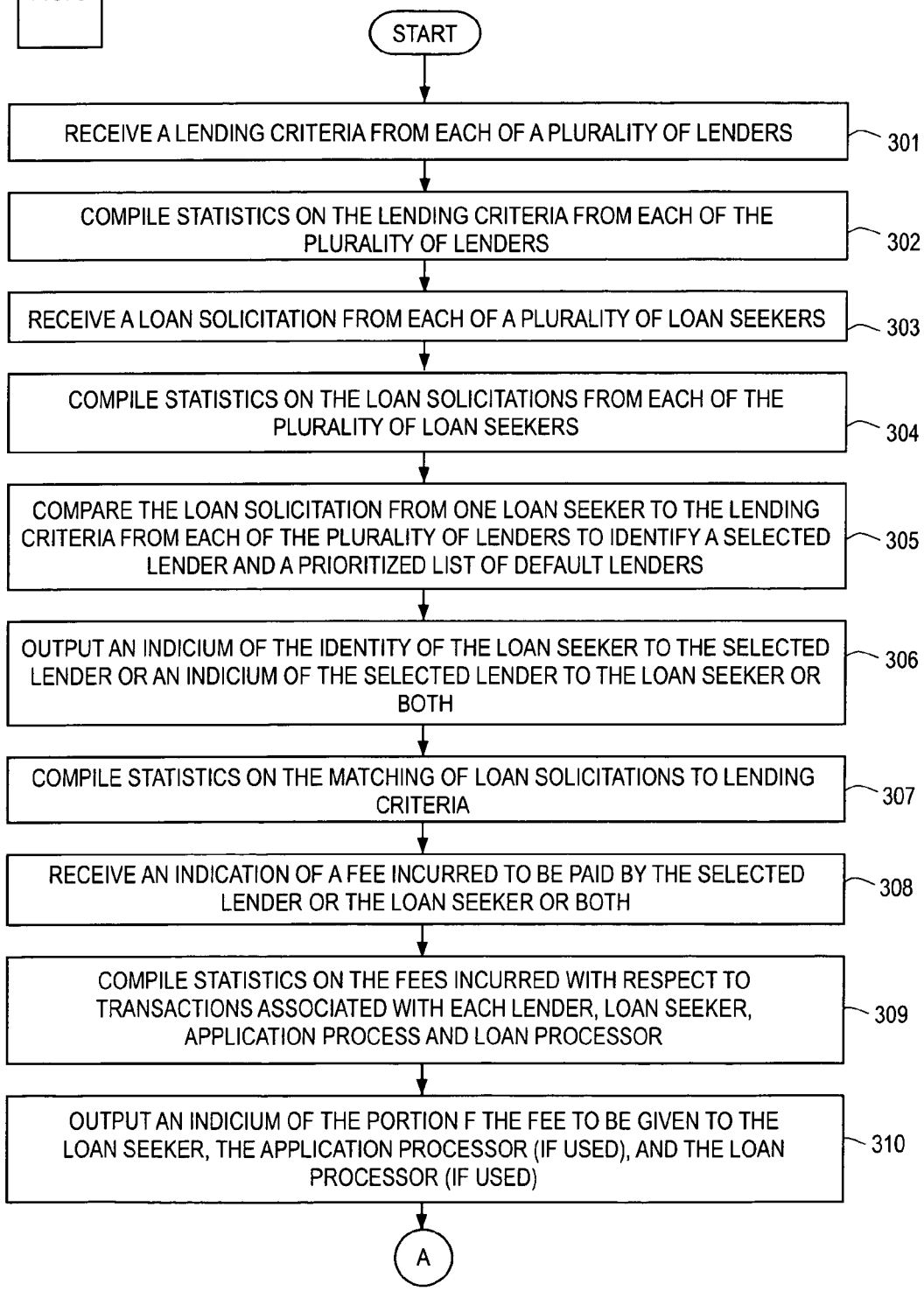

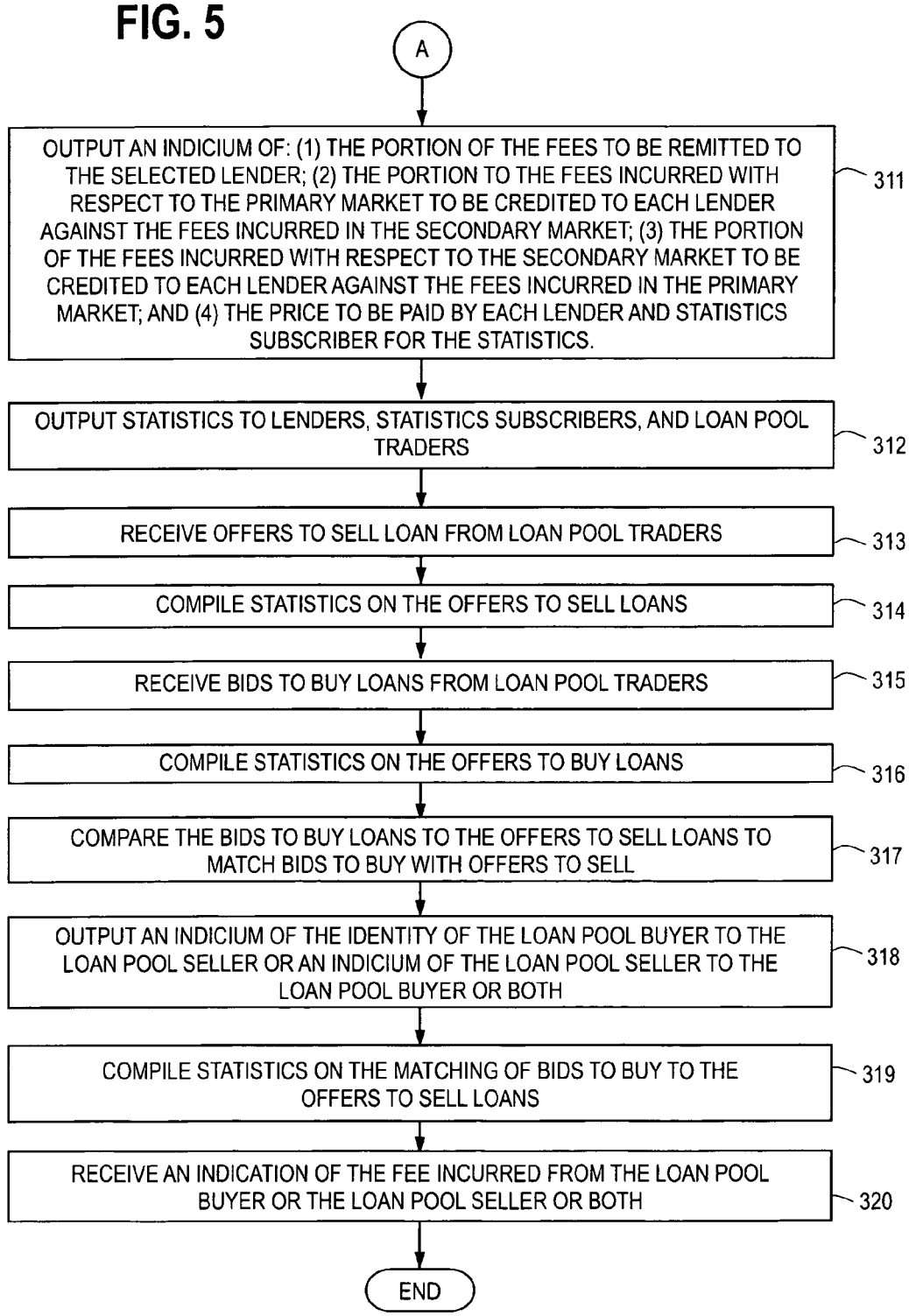

EFFICIENT MARKET FOR FINANCIAL PRODUCTS

This application is a continuation-in-part of, and claims the benefit of:

(1) U.S. patent application Ser. No. 09/178,400, filed Oct. 24, 1998 now abandoned, entitled "A Data Processing System for Providing an Efficient Market for Loans and Lines of Credit," which is incorporated by reference, and (2) U.S. patent application Ser. No. 09/296,573, filed Apr. 22, 1999, entitled "Data Processing System for Providing an Efficient Market for Insurance and Reinsurance," issued on Jul. 15, 2003 as U.S. Pat. No. 6,594,635, which is also incorporated by reference.

BACKGROUND

The present invention relates to electronic commerce in general, and, more particularly, to a data processing system that provides an efficient market for: (1) the provision of loans and lines of credit between lenders and those seeking loans or lines of credit, or the provision of insurance by insurers to insureds (the "primary," "retail" or "insurance" market), and (2) the buying and/or selling of existing loans or lines of credit among buyers and sellers, or the reinsurance of primary insurers by reinsurers (the "secondary," "wholesale" or "reinsurance" market).

As anyone who has ever sought a loan, line of credit, or insurance policy knows (hereinafter an "applicant"), it can be a challenge to find a lender or insurer who is willing to offer a loan, line of credit, or insurance policy at a reasonable interest rate or insurance premium and on reasonable terms. Although the verity of this statement is clear for loan applicants with poor credit histories and little collateral or insurance applicants who present poor risk, it is also true for those with excellent credit histories and substantial assets, and who present a good risk. For example, although many lenders/insurers might endeavor to provide some types of loans, lines of credit, or insurance, few lenders/insurers provide more than a small subset of all of the types of loans, lines of credit, or insurance offered by all of the lenders/insurers. One lender/insurer might offer only 30-year adjustable-rate home mortgage loans for under $300,000 or homeowner's insurance for single-family dwellings while another only offers 15-year fixed-rate home mortgage loans for over $70,000 or flood insurance for apartment dwellers. Therefore, even a creditworthy credit applicant or good risk insurance applicant might waste his or her time approaching lenders/insurers who do not offer the type of loan, line of credit or insurance product that he or she desires.

Furthermore, even if a creditworthy loan applicant or good risk insurance applicant finds a lender/insurer who does offer the type of loan, line of credit or insurance policy that he or she desires, the applicant is unlikely to know if that lender/insurer is offering the product at a competitive rate and on competitive terms. In general, there are three ways that an applicant can remedy this.

First, the applicant can contact (e.g., in person, on the telephone, etc.) numerous lenders/insurers and inquire into their interest rates or insurance premiums and terms for a particular loan, line of credit or insurance policy. In fact, many people do precisely this when seeking a home mortgage loan or automobile insurance because minor differences in interest rates and terms are well-known to result in substantial differences in monthly payments, and the premiums, terms, fees and underwriting standards of different insurers vary widely. Although it clearly pays to shop around, even the most stalwart are unlikely to contact more than a dozen lenders/insurers because of the time and effort involved.

Second, the applicant can consult newspapers and other periodicals that publish interest rates or insurance premiums and terms for a variety of lenders/insurers. Such listings are, however, unlikely to be comprehensive and are likely to be out-of-date, particularly in times when interest rates, insurance premium rates, or other contract terms are changing rapidly. One factor that accelerates the perishability of interest rates or insurance premiums in newspapers and periodicals concerns lenders/insurers who discover that their published interest rates or insurance premiums and terms are not competitive. Typically, those lenders/insurers immediately change their interest rates or insurance premiums and terms, but because of the latency in publishing and disseminating newspapers and periodicals those changes are not immediately known. Although an applicant can consult published resources that do not have a printing latency (e.g., the Internet sites of lenders or mortgage brokers, etc.), those rates are often misleading because they apply only to those borrowers who are most creditworthy or insureds or offer the best risk.

Third, the applicant can contact an "independent" loan broker or insurance agent who represents a plurality of lenders/insurers. The independent loan broker or insurance agent is not, however, obligated or motivated to provide the applicant with the least expensive loan, line of credit or insurance policy at the best terms, but rather the loan, line of credit or insurance policy that garners the loan broker or insurance agent the largest commission for the least cost. In other words, because the loan broker or insurance agent does not have a fiduciary duty to the applicant, and, therefore is not legally (or financially) motivated to find the applicant the least expensive loan or line of credit at the best terms, the applicant might be disadvantaged by using a loan broker or insurance agent rather than using a lender directly.

Regardless, when an applicant has satisfied himself or herself that he or she has found a lender/insurer who offers the desired loan, line of credit or insurance policy at a competitive interest rate or insurance premium and at reasonable terms, the applicant must thereafter expend an indeterminate amount of time and energy to learn if he or she qualifies for a desired loan, line of credit, or insurance policy from that lender/insurer. And although an applicant might satisfy himself or herself that he or she has located a lender/insurer with the best interest rate or insurance premium and terms, that does not mean that he or she has, in fact, done so. There could be other lenders/insurers, unknown to the applicant, who offer better interest rates or insurance premiums and terms, and who would accept the applicant.

Furthermore, the lender/insurer might decide that the applicant does not qualify for the desired loan, line of credit, or insurance policy, or that the applicant, because of credit problems, little collateral, poor health, accidents in the past or other high risk factors, does not qualify for the best interest rates or insurance premiums and terms, which are what brought the applicant to that lender/insurer in the first place. In either case, the applicant might have wasted his or her time in approaching the lender/insurer or might not receive the interest rate or insurance premium and terms that were anticipated.

The end result is that, in today's marketplace, it can be difficult for those seeking a loan, line of credit, or insurance policy to find a lender/insurer that is willing to offer the loan, line of credit or insurance policy that the applicant desires at a competitive interest rate or insurance premium and on competitive terms.

Perhaps surprisingly, it is even more difficult for each lender/insurer to find a satisfactory number of potential customers (i.e., applicants who are interested in and qualify for the particular lender's/insurer's loans and lines of credit or insurance products). In fact, some lenders/insurers spend millions of dollars per year on advertising to entice applicants to their door only to learn that many do not qualify for any type of loan, line of credit or insurance policy under the lender/insurer's lending or insurance underwriting standards. This is extremely inefficient and problematic for lenders/insurers because the money spent on advertising, 800-numbers, application takers and underwriting reviewers must be recouped from the earnings of those financial products that are, in fact, provided to applicants who do qualify and ultimately close a loan, line of credit or insurance policy In other words, a portion of the money (e.g., application fees, points, interest, insurance premiums, etc.) paid by those applicants who do close loans, lines of credit or insurance policies goes to pay for the lender/insurer's costs in advertising and culling out unacceptable applicants. Therefore, a lender/insurer could offer creditworthy or good-risk applicants lower fees, interest rates or premiums if the lender/insurer could forego advertising and had numerous applicants knocking on its door, all of whom were creditworthy or acceptable risks.

In summary, not only do applicants have difficulty locating a lender/insurer that offers the type of loan, line of credit or insurance product sought at competitive rates and on competitive terms, but it is also difficult for lenders/insurers to find large numbers of applicants who are interested in, and qualify for, the lender's offerings, and that are acceptable risks, without having to spend time and money on advertising and culling out the unqualified.

Therefore, the need exists for a mechanism that enables an applicant to quickly and easily find a lender/insurer that offers the loan, line of credit or insurance policy that he or she desires at competitive interest or premium rate and on competitive terms and that also provides lenders/insurers with large numbers of qualified applicants at a reasonable cost.

BRIEF SUMMARY

In general, in a first aspect, the invention features a method. A data processing system receives lending underwriting standards from each of a plurality of lenders. A first set of statistics is compiled in data processing system 101 based on the lending underwriting standards from each of the plurality of lenders. Data processing system 101 outputs the first set of statistics to a first lender at a price that is based on a measure of fees incurred with respect to the first lender.

In general, in a second aspect, the invention features a method. A data processing system receives lending underwriting standards from each of a plurality of lenders. Statistics are compiled in the data processing system based on the lending underwriting standards from each of the plurality of lenders. The data processing system outputs the statistics to a buyer and/or seller of loans. The data processing system receives from the first potential seller of a loan an offer to sell at least one loan.

In general, in a third aspect, the invention features a method. A data processing system receives lending underwriting standards from a lender. The data processing system outputs an indicium that a first portion of a first measure of fees incurred with respect to the lender for lending through the data processing system can be credited against a second measure of fees incurred by the lender for buying and/or selling at least one loan through the data processing system.

In general, in a fourth aspect, the invention features a method. A data processing system receives an offer to sell at least one loan from a potential seller. The data processing system outputs an indicium that a first portion of a first measure of fees incurred with respect to the potential seller for buying and/or selling loans through the data processing system can be credited against a second measure of fees incurred by the seller for lending through the data processing system.

In general, in a fifth aspect, the invention features a method for performance by a provider of intermediation services. In a market for financial products in which transactions occur among market participants in distinct first and second sectors, intermediation services are provided for transactions in each of the two sectors. A predetermined pricing schedule for the intermediation services provides for credits for transaction fees paid by a party for intermediation of transactions in the first sector for redemption against fees payable by the party for intermediation of transactions in the second sector.

In general, in a sixth aspect, the invention features a method for performance by a provider of intermediation services. In a market for financial products in which transactions occur in distinct first and second sectors, intermediation services are provided for transactions in each of the two sectors. Information is offered for sale to parties that conduct transactions in the second sector, the information being information captured in the course of providing intermediation services in the first sector. The offer is under a prearranged pricing schedule providing reductions in the price of the information as fees increase for intermediation services provided for transactions in the first sector.

In general, in a seventh aspect, the invention features a method for performance by a provider of intermediation services. On a secondary market for buying and selling of loans to consumers, intermediation services are provided for buying and selling the loans. A predetermined pricing schedule for intermediation services provides that transaction fees paid by a party for intermediation of transactions are to be credited against fees payable by the party for intermediation of other transactions, and provides for reduced pricing for access by a party to research information describing the loans. The price reduction is based on increased transaction volume by the party.

In general, in an eighth aspect, the invention features a method, for performance by a provider of computer information services. During an application process for financial products offered by a plurality of offerors, information is obtained describing applications made by a plurality of applicants for the financial products and submitted for matching against underwriting standards of the offerors. The application information is stored in a database. Essentially contemporaneously with the closing of each of a plurality of the financial products, the database is updated with information describing the closed financial products. The database is made available to parties on a secondary market for the financial products.

In general, in a ninth aspect, the invention features a computerized method. Information is obtained from a loan applicant, the information relating to the qualifications of the applicant relative to underwriting standards of a plurality of lenders, for retail origination of a financial product. The applicant's information is matched against underwriting standards of a plurality of lenders. From among those lenders having underwriting standards that the applicant meets, an indicium of the identity of the lender that has the best combination of low interest rate and fees and best contractual terms is identified to the applicant.

In general, in a tenth aspect, the invention features a method for performance by a provider of computer information services. In a market for financial products, parties are offered real-time or near real-time access to statistics reflecting transactions in the financial products. The statistics reflect financial products offered by a plurality of offerors to consumers. The statistics are gathered and offered essentially contemporaneously with the preparation by consumers of applications for the financial products and/or essentially contemporaneously with the closing of the financial products.

Preferred embodiments of the invention may include one or more of the following features.

The financial products may be loans or lines of credit to consumers, for example, home mortgages, automobile loans, or personal loans. The financial products may be consumer insurance, for example, homeowners' or auto insurance. The financial products may be commercial or business loans or lines of credit or business insurance.

The first sector may be a retail origination market for the loans, lines of credit or insurance and the second sector may be a wholesale secondary market on which the loans or lines of credit are bought and sold, or reinsurance is sought. Alternatively, the first and second sectors may be switched vice versa.

From among those offerors having underwriting standards satisfied by the applicant, the applicant may be provided a list of alternative offerors prioritized by low price (e.g., interest rate or insurance premium) and fees and best contractual terms. The best combination may be determined by comparing interest rates, or may be determined by comparing the annual interest rate, excluding adjustments for origination fees and points, or may be determined by comparing interest rate, fees, and other contractual terms.

The credits may expire if not redeemed within a specified time period. The time period may be the close of a month following the month in which the credits are provided, or the close of the month immediately following the month in which the credits are provided.

The information offered may include a lowest interest rate offered by any lender to a loan applicant meeting a profile specified by the party purchasing the information. The information may include statistical characterizations of transaction volume in the financial products. The information may include an enumeration of loan underwriting standards used by lenders of the loans or lines of credit. The information may include a volume of loan applications meeting a profile specified by the party purchasing the information. The information may include a statistical characterization of loans closed, the loans meeting a profile specified by the party purchasing the information. The information may include a statistical characterization of loan pools bought and/or sold, the pools meeting a profile specified by the party purchasing the information.

The above advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

FIG. 2 depicts a block diagram of data processing system 101 depicted in FIG. 1.

FIG. 3 depicts the relationship of FIGS. 4 and 5.

FIG. 4 depicts a first portion of a flowchart of the operation of data processing system 101.

FIG. 5 depicts a second portion of a flowchart of the operation of data processing system 101.

DESCRIPTION

Figure 1:
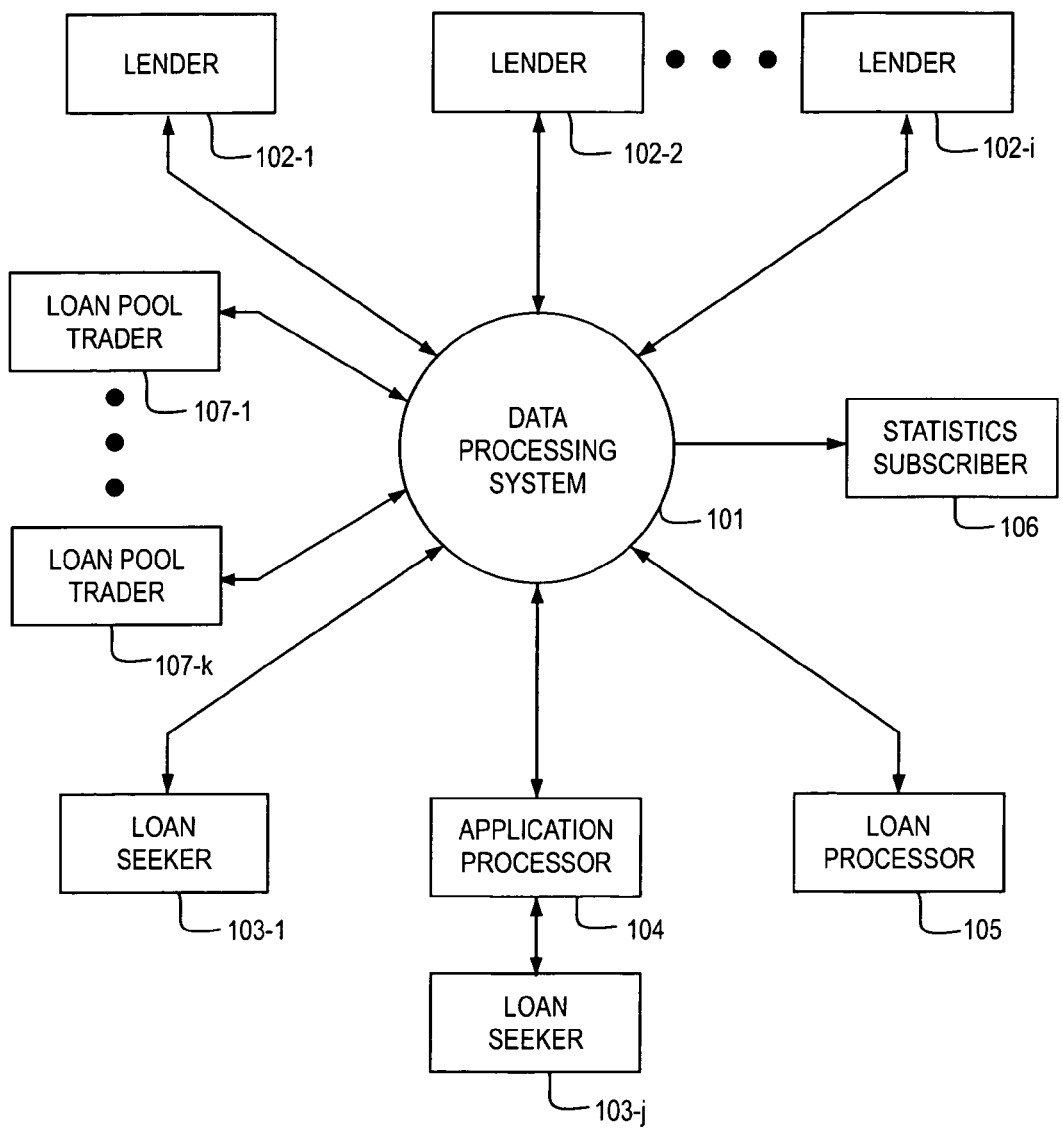
FIG. 1 depicts a schematic diagram of data processing system 101.

Referring to FIG. 1, data processing system 101 may provide an efficient market for: (1) the provision of loans and lines of credit from lenders to those seeking loans, lines of credit, or insurance from insurers to those seeking insurance, and (2) the buying and selling of existing loans between buyers and sellers of loans or reinsurance of existing insurance policies. In particular, data processing system 101 provides an efficient market that not only invites lenders/insurers, applicants, buyers and sellers of loans, reinsurers and reinsureds to patronize the system, but that induces them to patronize it as well.

The inducement is manifested in several ways. They include, but are not limited to:

For Applicants:
  data processing system 101 provides an applicant with a single "one-stop-shopping" source that matches the applicant to an lender/insurer who offers the loan, line of credit or insurance policy sought;
  data processing system 101 matches an applicant to only those lenders and/or insurers whose underwriting standards are satisfied by the applicant's application; and
  data processing system 101 guarantees an applicant that he or she is being offered the best interest rate or insurance premium or the best terms or both available from those lender/insurers who patronize the system (of those lenders/insurers who deem the applicant creditworthy or an acceptable risk and who offer the loan, line of credit or insurance policy sought).

For Lenders/Insurers:
  data processing system 101 provides those lenders/insurers who offer competitive interest rates or insurance premiums or terms or both with a large number of applicants who the lender/insurer deems creditworthy or an acceptable risk at a lower cost than in the prior art, which lowers the lender/insurer's cost of doing business that, in turn, enables the lender/insurer to offer even better interest rates or insurance premiums and terms;
  data processing system 101 provides those lenders/insurers who offer competitive interest rates or insurance premiums or terms or both with statistics regarding the market in loans, lines of credit, insurance and reinsurance, which can be used by the lenders/insurers to: (1) determine which types of loans, lines of credit, or insurance they should offer and at what interest rates or insurance premiums and terms, (2) arbitrage those lenders/insurers who do not have access to the statistics, (3) cost/value the loans or insurance policies in their portfolio, which facilitates the sale of those loans or reinsurance of those policies, which, in turn, increases the lender's/insurer's liquidity, reduces their risk, and lowers their cost of doing business; and (4) cost/value the loans or insurance policies of other lenders/insurers being offered for sale, which facilitates the purchase of those loans or reinsurance of those policies, which, in turn, increases their liquidity, distributes their risk, and lowers their cost of doing business.
  data processing system 101 provides those lenders/insurers who offer competitive rates or terms or both with an efficient market for the purchase and sale of the servicing of loans or insurance policies (e.g., providing payment or premium collection, claims adjusting, and other administrative overhead, etc.); and data processing system 101 provides every lender with the capability to get a loan for its customers when the lender itself does not offer the type of loan sought (or does offer the type of loan sought but not at a competitive interest rate or terms) by enabling the lender to act as an application processor for its customers, and thereby earn a fee by acting as an application processor.

For Buyers and Sellers of Loans, Reinsurers and Reinsureds:

Data processing system 101 provides buyers and sellers of loans, reinsurers and reinsureds with an efficient market for buying and selling individual loans and pools of heterogeneous loans, and/or reinsurance of existing policies;

data processing system 101 provides buyers and sellers of loans, reinsurers, and/or reinsureds with an efficient market for buying and selling individual loans and pools of loans at prices based on the closing attributes of the loans;

data processing system 101 may provide buyers and sellers of loans with statistics regarding the market in pools of loans, which can be used by the buyers and/or sellers of loans to: (1) assess the value of an individual loan, (2) assess the value of a loan or pool of loans, (3) determine which types of loans they desire to buy and sell, and (4); arbitrage those buyers and/or sellers, reinsurers, and/or reinsureds who do not have access to the statistics.

data processing system 101 may provide reinsurers, and/or reinsureds with statistics regarding the market in insurance and reinsurance that are of value in: (1) assessing the cost/value of individual policies that are to be reinsured; (2) determining which policies they desire to reinsure and at what price, and (3) arbitraging those reinsurers and/or reinsureds who do not have access to the statistics.

data processing system 101 may provide buyers and/or sellers with an efficient market for the purchase and sale of the servicing of pools of loans (e.g., providing payment collection and other administrative overhead, etc.).

These inducements are possible because the costs of doing business for lenders, insurers, reinsurers, reinsureds and buyers and/or sellers of loans and the interest rates or insurance premiums and fees to applicants are unnecessarily high because efficient markets for loans, lines of credit, insurance and reinsurance do not exist. Furthermore, if a highly efficient market for loans, lines of credit, insurance and reinsurance did exist, the cost of doing business for lenders, insurers, reinsurers, reinsureds and buyers and/or sellers of loans could decrease, the interest rates or insurance premiums and fees to applicants could decrease, and the provider of the market could also make a profit. Furthermore, the existence of an efficient market could even provide lenders/insurers with a larger profit than they make now if operating costs drop more quickly than interest rates or insurance premiums drop. In other words, the intermediation of an efficient market between applicants, lenders, insurers, reinsurers, reinsureds and buyers and/or sellers of loans can actually make the cost of loans, lines of credit, or insurance to applicants go down, the cost of doing business to lenders, insurers, reinsurers, reinsureds and buyers and/or sellers of loans go down and the profits to lenders, insurers, reinsurers, reinsureds and buyers and/or sellers of loans go up. Therefore, data processing system 101 endeavors to provide a market for the provision of loans, lines of credit, insurance and reinsurance that is highly efficient.

The efficiency of the market for loans, lines of credit and/or insurance (the primary or retail market) may be affected by the efficiency of the market in pools of loans and/or reinsurance (the secondary or wholesale market) and vice versa. Therefore, data processing system 101 may improve the efficiency of both the primary market and the secondary market so that, to the extent the efficiency in one enhances the efficiency in the other, a synergy of efficiency between the two markets is affected. For example, to effect this synergy, fees incurred by a patron to the owner/operator of data processing system 101 for lending through the primary market might be credited against the fees incurred by the patron to the owner/operator of data processing system 101 for buying and/or selling through the secondary market (and vice versa).

Merely providing a market and inviting applicants, lenders, insurers, reinsurers, reinsureds and buyers and/or sellers of loans to patronize may be, in and of itself, insufficient to yield an efficient market. The prerequisite to an efficient market is volume—in numbers of applicants, lenders, insurers, reinsurers, reinsureds and buyers and/or sellers of loans, and dollars transacted—and the prerequisite to volume is an efficient market. This Catch-22 has, until now, stemmed the development of an efficient market in loans, lines of credit, insurance and reinsurance.

To overcome this predicament, data processing systems 101 might incorporate one or more mechanisms that prime an efficient market and that reinforce the efficiency of the market. Three illustrative mechanisms are:

First, the pro rata fees incurred with respect to transactions associated with a patron for patronizing the system might decrease as the total fees incurred by transactions associated with that patron increase. For example, although the owner/operator of data processing system 101 might receive a fee from a lender/insurer when the lender/insurer closes a loan or writes an insurance policy through the system, a portion of the fee might be remitted back to the lender/insurer for having closed a large volume of business through the system in a given interval. Advantageously, the fees from all types of loans, lines of credit and/or insurance policies are aggregated for determining the amount of the remittance. Such a remittance schedule could be:

TABLE 1

Illustrative Remittance Schedule

| Total Fees Incurred With Respect To Transactions Associated With Patron In The Last Month | % of Total Fees Incurred To Be Remitted Back To Lender/Insurer |
|---|---|
| $0 to $250,000 | 0% |
| $250,001 to $500,000 | 5% |
| $500,001 to $1,000,000 | 15% |
| $1,000,001 to $5,000,000 | 35% |
| $5,000,001 to $100,000,000 | 50% |

Therefore, this mechanism encourages lenders/insurers to patronize the system with larger, rather than smaller, volumes, which is accomplished by endeavoring to offer the most varieties of loans, lines of credit, or insurance at the lowest interest rates or insurance premiums and at the best possible terms.

Second, some or all of the parties who patronize the system might receive statistics compiled by the system on the condition of the market (i.e., a service analogous to the Bloomberg News Service or a stock ticker, etc.) in loans, lines of credit, and/or insurance products. Although these statistics cost the owner/operator of data processing system 101 little to compile, their value is so great that lenders, insurers, reinsurers, reinsureds and buyers and/or sellers of loans who do not have access to the statistics will have difficulty, in the long run, in competing with those who do. An analogy makes the situation clear; a trader of stocks without access to the stock ticker and current bid and offer quotations can be arbitraged by a trader who does.

Furthermore, although some or all of the statistics might be sold for cash, the statistics are advantageously given for free, or sold at a subsidized price, to those patrons of the system who actually transact business through the system. Advantageously, the price for the statistics decreases as the measure of fees incurred by transactions associated with a patron increases. For the purposes of this specification, the provision of statistics for free, or at a subsidized price, to those patrons of the system who close loans, buy and/or sell loans, write insurance policies, and/or reinsure risks or both through the system is called "netbacking."

An illustrative netbacking schedule could be:

TABLE 2

Illustrative Netbacking Schedule

| Total Fees Incurred With Respect To Transactions Associated With Patron In The Last Month | Cost of Statistics to Patron |
| --- | --- |
| $0 to $250,000 | $1,000,000 |
| $250,001 to $500,000 | $750,000 |
| $500,001 to $1,000,000 | $250,000 |
| $1,000,001 to $5,000,000 | $100,000 |
| >$5,000,000 | $0 (free) |

Netbacking also encourages lenders/insurers to patronize the system with larger, rather than smaller, volumes, which is accomplished by endeavoring to offer the most varieties of loans, lines of credit, or insurance at the lowest interest rates or insurance premiums and at the best possible terms.

Third, a portion of the fees incurred with respect to transactions associated with a lender for lending through data processing system 101, or with an insurer for writing policies to insurance applicants, might be credited against the fees incurred with respect to transactions associated with the lender for buying and/or selling loans through the system, or with respect to reinsurance transactions (as either buyer, seller, reinsurer and/or reinsured). For example, many lenders desire to sell a loan immediately after they have made it, and many insurers who write policies immediately seek reinsurance (i.e., to transfer all, or a portion of, the risk associated with the policy to a reinsurer). It is, therefore, possible that a lender/insurer will lend to an applicant or write a policy through the system, and incur a fee for doing so, and then sell that loan or reinsure that policy through the system and incur a second fee. Data processing system 101 credits, according to some credit schedule, a portion of the fees associated with a patron for lending or writing insurance through the system against the fees incurred for buying or selling a loan or for reinsuring through the system. Such a credit schedule could be:

TABLE 3

Illustrative Credit Schedule

| Total Fees Incurred With Respect To Transactions In Primary Market With Respect To Patron In The Last Month | % of Total Fees Incurred With Respect To Transactions In Primary Market To Be Credited Against Total Fees Incurred With Respect To Transactions In Secondary Market |
| --- | --- |
| $0 to $250,000 | 0% |
| $250,001 to $500,000 | 5% |
| $500,001 to $1,000,000 | 10% |
| $1,000,001 to $5,000,000 | 20% |
| >$5,000,000 | 35% |

An alternative embodiment, in the loan context, works in reverse and credits, according to some schedule, a portion of the fees incurred with respect to transactions associated with a patron who buys and/or sells loans through the system against the fees incurred for lending through the system. In the insurance context, this alternative embodiment works in reverse and credits, according to some schedule, a portion of the fees earned with respect to a patron in reinsuring through the system against the fees incurred by the patron in a transaction for writing insurance through the system. In yet another embodiment, in the loan context, the fees incurred in buying and/or selling loans through the system are credited against the fees for lending through the system, and the fees incurred for lending through the system are credited against the fees for buying and/or selling loans through the system. In yet another embodiment, in the insurance context, the fees incurred in reinsuring through the system are credited against the fees for writing insurance through the system, and the fees incurred writing insurance through the system are credited against the fees for reinsuring through the system.

Therefore, this mechanism also encourages lenders/insurers to patronize the system with larger, rather than smaller, volumes, which is accomplished by endeavoring to offer the most varieties of loans, lines of credit, or insurance at the lowest interest rates or insurance premiums and at the best possible terms, and by patronizing the secondary market in loans or reinsurance with the best possible bids and offers.

The end result is that in order to compete in the consumer finance and/or insurance markets, lenders, buyers and/or sellers of loans, insurers, reinsurers and/or reinsureds must have access to the statistics, which encourages them to patronize the system with competitive offerings to get access to the statistics, which increases the competitiveness of the market, increases its volume, and promotes its efficiency. Therefore, some embodiments prime the market for efficiency and incorporate a positive feedback mechanism that maintains that efficiency. It is understood, however, that the priming of embodiments might be assisted by advertising and other marketing techniques.

FIG. 1 depicts a schematic diagram of data processing system 101, which provides a market for: (1) the provision of loans, lines of credit and/or insurance from a plurality of lenders/insurers (e.g., lenders/insurers 102-1 through 102-$i$) to a plurality of applicants (e.g., applicants 103-1 through 103-$j$), and (2) the buying and selling of loans between buyers and sellers of loans (e.g., buyers and/or sellers of loans 107-1 through 107-$k$), or reinsurance of existing policies by a plurality of reinsurers to a plurality of reinsureds (not shown).

One or more loan application processors or insurance agents 104 and one or more loan processors or underwriters 105 might advantageously be engaged to facilitate the provision of loans, lines of credit, or insurance between lenders/insurers and applicants.

An "application processor" is an intermediary that prepares a loan or insurance application (e.g., by filling out the paperwork, by entering the applicant's pertinent information into data processing system 101 via a computer terminal, etc.). Although a sophisticated applicant can act as his or her own application processor, it might be desirable for a less sophisticated applicant to have another entity act as an application processor.

An "application" may, depending on context, include an inquiry regarding a loan or line of credit and/or insurance, without a full application being prepared and considered for funding.

A "loan processor" is an entity that evaluates the compliance of a loan and/or insurance application against lending and/or insurance underwriting standards. Although lenders/insurers often act as their own loan processors, a lender/insurer might employ another entity to act as a loan processor.

Furthermore, because many entities in the loan, credit and insurance industries are large and sophisticated, it is common for a single entity to perform different roles at different times or with respect to different transactions. Therefore, a single entity can be:

(i) a lender, or (ii) a buyer or seller of loans, or (iii) an application processor, or (iv) a loan processor, or (v) an insurer, or (vi) or reinsurer, or (vii) a reinsured, or (viii) an underwriter, or (ix) an applicant; or (x) an insurance agent, or (xi) any combination of i-x.

Data processing system 101 receives data from each lender, applicant, application processor, loan processor, buyer and/or seller of loans, insurer, reinsurer, reinsured, insurance agent and/or underwriter, and endeavors to match lenders/insurers with appropriate applicants and reinsurers with appropriate reinsureds, to facilitate the provision of loans and lines of credit. Each lender, applicant, application processor, loan processor, buyer and/or seller of loans, insurer, reinsurer, reinsured, insurance agent and/or underwriter is advantageously capable of providing data to and receiving data from data processing system 101 via a data network (e.g., the Internet, etc.) or via a telephone network (e.g., the Public Switched Telephone Network, etc.) or both.

FIG. 2 depicts an illustrative embodiment of data processing system 101, which comprises: computer 201, local output device 202, data storage device 203, telephone center 204, telephone network interface 205, and data network interface 206. Computer 201 is advantageously a general-purpose computer as is well-known in the art that is capable of:

executing one or more programs that are stored in data storage device 203;

storing data in and retrieving data from data storage device 203;

outputting data to local output device 202;

receiving data from and outputting data to telephone center 204; and receiving data from and outputting data to data network interface 206.

Local output device 203 is a device (e.g., a printer, a tape drive, removable hard disk, etc.) from which data from data processing system 101 can be output for processing or delivery to lenders, applicants, application processors, loan processors, buyers and sellers of loans, insurers, reinsurers, reinsureds, insurance agents, underwriters, and/or statistics subscribers.

Data storage device 203 is advantageously a non-volatile memory (e.g., a hard disk, a tape drive, an optical device, etc.) for storing the program code executed by computer 201 and the data input into and generated by data processing system 101.

Data network interface 206 enables lenders, applicants, application processors, loan processors, buyers and/or sellers of loans, insurers, reinsurers, reinsureds, insurance agents, underwriters, and/or statistics subscribers to communicate with data processing system 101 via a data network, such as the Internet. For example, data processing system 101 can be accessed via the World Wide Web.

Alternatively, lenders, applicants, application processors, loan processors, buyers and/or sellers of loans, insurers, reinsurers, reinsureds, insurance agents, underwriters, and/or statistics subscribers can communicate with data processing system 101 via telephone, such as through a toll-free "800" number. To this end, telephone network interface 205 advantageously comprises one or more telephones that are capable of receiving calls from and placing calls to lenders, applicants, application processors, loan processors, buyers and/or sellers of loans, insurers, reinsurers, reinsureds, insurance agents, underwriters, and/or statistics subscribers. Telephone network interface 205 can further comprise an automatic call distribution system, in well-known fashion, for routing incoming calls to the various telephones. Furthermore, telephone network interface 205 is advantageously capable of receiving information from lenders, applicants, application processors, loan processors, buyers and/or sellers of loans, insurers, reinsurers, reinsureds, insurance agents, underwriters, and/or statistics subscribers via a touch-tone interface wherein the parties input information to the system by pushing the buttons on their telephones in response to questions from an automated operator.

Telephone center 204 advantageously comprises one or more computer terminals that are operated by the personnel associated with telephone network interface 205 such that an operator (either human or automated) can shuttle data between computer 201 and a lender, applicant, application processor, loan processor, buyer and/or seller of loans, insurer, reinsurer, reinsured, insurance agent, underwriter, and/or statistics subscriber who is in contact with data processing system 101 via telephone network interface 205.

It will be clear to those skilled in the art how to make and use computer 201, local output device 202, data storage device 203, telephone center 204, telephone network interface 205, and data network interface 206. Although data processing system 101 is shown as depicting only one computer and one storage device, it will be clear to those skilled in the art that a data processing system in accordance with the present invention can also comprise one or more computers and one or more storage devices.

FIG. 3 depicts the relationship of FIGS. 4 and 5, and FIG. 4 depicts a first portion of a flowchart of the operation of data processing system 101.

At step 301, lending and/or insurance underwriting standards are received at data processing system 101 from each of a plurality of lenders and/or insurers. Each lending and/or insurance underwriting standard can be received at data processing system 101 via a data network and data network interface 206 or via a telephone network and telephone network interface 205.

Typical lending underwriting standards include one or more of the following:

i. the types of loans and lines of credit that a lender is endeavoring to provide; or
ii. one or more minimum standards that an applicant must satisfy before the applicant is matched to the lender by data processing system 101; or
iii. the interest rate, fees, and terms for each type of loan or line of credit that the lender is endeavoring to provide; or
iv. any combination of i, ii, and iii.

For example, Lender A can input into data processing system 101 a set of lending underwriting standards that indicates that it is endeavoring to provide: (1) home mortgage loans, (2) auto loans, (3) personal loans, (4) small business loans, and (5) accounts receivable loans, and the underwriting standards, interest rates or insurance premiums, fees and terms by which it endeavors to make such loans. Although an underwriting standard can be quite complicated and is typically different for each lender/insurer, Table 4a provides an example of a lending underwriting standard that one lender, Lender A, might input into data processing system 101 for 30-year fixed-rate home mortgage loans.

TABLE 4a

Lending Underwriting Standards for Lender A for Home Mortgage Loans

| Amount of Loan | Loan Applicant's Income | Location of Home (by Postal ZIP Code) | Interest Rate |
|---|---|---|---|
| $25,000–$50,000 | >$28,000/year | 077xx, 078xx, 079xx | 7.15% |
| $50,001–$128,000 | >$46,500/year | 0770x, 078xx, 0792x | 7.15% |
| $50,001–$128,000 | >$66,000/year | 0770x, 078xx, 0792x | 7.05% |
| $128,001–$217,000 | >$75,000/year | 07701, 078xx, 0792x | 7.20% |
| $217,001–$310,000 | >$105,000/year | 0781x, 0792x | 7.35% |

Typical insurance underwriting standards may include one or more of the following:
i. each insurance product that an insurer is endeavoring to provide (e.g., flood insurance, health insurance, life insurance, etc.); and
ii. an underwriting standard for each insurance product; including one or more minimum standards that an applicant must satisfy; or
iii. the premiums, fees, and terms for each insurance product; or
iv. any combination of i, ii, and iii.

For example, Insurer A can input into data processing system 101 data that indicates that it is endeavoring to provide: (1) auto liability insurance, (2) auto collision insurance, (3) life insurance, (4) key-man insurance, and (5) disability insurance, and the underwriting standards, interest rates or insurance premiums, fees and terms by which it endeavors to write such insurance. Although an underwriting standard and premium schedule can be quite complicated and is typically different for each insurer, Table 4b provides an example of an underwriting standard that one insurer, Insurer A, might input into data processing system 101 for auto liability insurance.

TABLE 4b

Underwriting Standard for Insurer A for Auto Liability Insurance

| Amount of Coverage | Insurance Applicant's Age | Points on License (for driving infractions) | Premium (per month per thousand dollars coverage) |
|---|---|---|---|
| $25,000–$50,000 | >16 years old | 0 | $2.80 |
| $50,001–$150,000 | >18 years old | ≦2 | $2.25 |

TABLE 4b-continued

Underwriting Standard for Insurer A for Auto Liability Insurance

| Amount of Coverage | Insurance Applicant's Age | Points on License (for driving infractions) | Premium (per month per thousand dollars coverage) |
|---|---|---|---|
| $100,001–$250,000 | >18 years old | ≦0 | $1.47 |
| $150,001–$500,000 | >21 years old | ≦2 | $0.78 |
| $500,001–$1,000,000 | >25 years old | ≦4 | $0.45 |

In contrast, another lender, Lender B, might input into data processing system 101 a lending underwriting standard that indicates that it is endeavoring to provide: (1) home mortgage loans, (2) auto loans and (3) student loans, wherein the underwriting standard for 30-year fixed-rate home mortgage loans is summarized in Table 5a.

TABLE 5a

Lending Underwriting Standards for Lender B for Home Mortgage Loans

| Amount of Loan | Loan Applicant's Income | Tenure at Job | Interest Rate |
|---|---|---|---|
| $20,000–$40,000 | >$25,000/year | 12 months | 7.10% |
| $40,001–$108,000 | >$44,000/year | 18 months | 7.15% |
| $108,001–$165,000 | >$55,000/year | 18 months | 7.25% |
| $165,001–$200,000 | >$85,000/year | 24 months | 7.30% |
| $200,001–$250,000 | >$100,000/year | 24 months | 7.35% |

In another alternative, Insurer B might input into data processing system 101 data that indicates that Insurer B is endeavoring to provide: (1) auto liability insurance, (2) auto collision insurance and (3) malpractice insurance, wherein the underwriting standard and premium schedule for auto liability insurance is summarized in Table 5b.

TABLE 5b

Underwriting Standard for Insurer B for Auto Liability Insurance

| Amount of Coverage | Insurance Applicant's Age | How Long Ago Was Last Moving Violation | Premium (per month per thousand dollars coverage) |
|---|---|---|---|
| $10,000–$50,000 | >18 years old | >1 year | $3.27 |
| $50,001–$150,000 | >18 years old | >1 year | $1.81 |
| $150,001–$400,000 | >18 years old | >3 years | $1.12 |
| $150,001–$500,000 | >21 years old | >3 years | $0.56 |
| $500,001–$1,000,000 | >27 years old | >5 years | $0.27 |

It should be noted that not only are the underwriting standards for home mortgage loans and auto liability insurance for Lender/Insurer A (Tables 4a and 5a) different than the standards for Lender/Insurer B (Tables 4b and 5b), but that the factors in the standards are also different. For example, although both Lender A and Lender B use the amount of the loan and the applicant's income as a factor in their lending underwriting standards, only Lender A (Table 4a) uses the geographic location of the home as a standard in lending. In contrast, only Lender B (Table 5a) uses the applicant's tenure at his or her job as a factor in his lending underwriting standard. In another example, although both Insurer A and Insurer B use age as a factor in their insurance underwriting standards, only Insurer A (Table 4b) uses the number of points on the insurance applicant's license as an insurance underwriting factor. In contrast, only Insurer B (Table 5b) uses how long ago was the applicant's last moving violation as a factor in the insurance underwriting standard.

Therefore, it will be clear to those skilled in the art that the sample lending and underwriting standards depicted in Tables 4a, 4b, 5a and 5b are simplified for pedagogical purposes and that the lending and/or underwriting standards used by other lenders/insurers can be significantly more complicated. Furthermore, it will be clear to those skilled in the art how to create and input a lending and/or insurance underwriting standard into data processing system 101 for one or more types of loans, lines of credit, insurance and reinsurance and for any set of factors, standards, interest rates, insurance premiums, fees and terms.

Therefore, it should be understood that data processing system 101 does not set or affect the underwriting standards used by the insurers who patronize the system, but accepts any set of factors that an insurer desires as an underwriting standard.

A lender/insurer can input or revise an underwriting standard in data processing system 101 at any time, or withdraw a portion of an underwriting standard, or withdraw an insurance product or associated premium, fee or term in data processing system 101 at any time. This is to enable a lender/insurer to adjust his or her offering as its situation and market conditions change.

The list of lending and/or insurance underwriting standards, insurance products, premiums, fees and/or terms from each of the plurality of lenders/insurers are stored in loan/underwriting standard database 251 in data storage device 203.

At step 302, data processing system 101 compiles statistics on the lending or insurance underwriting standards, insurance products, premiums, fees and/or terms received from the plurality of lenders/insurers. Such statistics might include, but are not limited to:

- the number of lenders/insurers who have lending and/or insurance underwriting standards pending in data processing system 101;
- the number of lenders/insurers who are endeavoring to provide loans or lines of credit for each type of loan or insurance product;
- any element of an underwriting standard, premium, fee or term as a function of any other element of an underwriting standard, premium, fee or term—to answer questions such as "What is the lowest interest rate cited in a lending underwriting standard for a home mortgage loan for $86,000 in Manhattan to an applicant who earns $102,000 per year and who has been at their current job for two years?" and "What is the largest auto loan available to an applicant to earns $34,000 per year?" or "What is the insurance premium cited in an underwriting standard for auto liability insurance for $86,000 of coverage in Manhattan to an applicant who is 47 years old and who has 9 points on its license?" and "What is the greatest amount of auto liability coverage available to an applicant who is 19 years old?"
- the elements for any loan, line of credit or insurance policy—to answer questions such as "What are individual elements considered by all lenders/insurers endeavoring to provide home mortgage loans?" or "What are individual elements considered by all lenders/insurers endeavoring to provide auto liability insurance?"

It will be clear to those skilled in the art how to compile such statistics from the lending and/or insurance underwriting standards received. Advantageously, step 302 is performed each time a new or revised lending and/or insurance underwriting standard, insurance product, premium, fee or contract term is received by data processing system 101 or withdrawn.

The statistics compiled at step 302 are stored in statistical database 253 in data storage device 203. Because the statistics stored in statistical database 253 are valuable, they can be sold or provided as described below with respect to step 312.

At step 303, an application is received at data processing system 101 from each of one or more applicants. As with the underwriting standard, each application can be received at data processing system 101 via a data network and data network interface 206 or via a telephone network and telephone network interface 205. Furthermore, each application can be a mere inquiry about the availability of a loan, line of credit or insurance policy, its interest rates or insurance premiums, fees, and terms, or it can be a contractual offer to enter into a loan, line of credit agreement, or insurance binder.

Each application can be received at data processing system 101 directly from an applicant or indirectly through an entity that acts as an application processor or insurance agent for the applicant or insurer. In either case, a record is kept in netbacking database 255 of whether an application processor or insurance agent is used, and if so, who the application processor or insurance agent is. The purpose of keeping a record of whether an application processor or insurance agent is used is to ensure that the application processor or insurance agent is compensated for his or her service, as discussed in detail below with respect to step 310.

Advantageously, each application is received in the form of answers to a series of questions, which questions are based, at least in part, on the statistics compiled in step 302. In particular, the questions are designed to elicit answers that enable data processing system 101 to determine how well the application compares to the lending and/or insurance underwriting standard from each lender/insurer. In other words, the questions are designed to provide data processing system 101 with that necessary data to enable it to match, if possible, each applicant to the most appropriate lender/insurer.

For example, if the two lenders, Lender A and Lender B discussed above, are the only two lenders who have input underwriting standards into data processing system 101, then the two lenders, in aggregate, are endeavoring to provide the six types of loans or lines of credit shown in Table 6a.

TABLE 6a

| Types of Loans and Lines of Credit Available |
|---|
| accounts receivables loans |
| auto loans |
| home mortgage loans |
| personal loans |
| small business loans |
| student loans |

In another example, if the two insurers, Insurer A and Insurer B discussed above, are the only two insurers who have input underwriting standards into data processing system 101, then the two insurers, in aggregate, are endeavoring to provide the six types of insurance shown in Table 6b.

TABLE 6b

| Types of Insurance Available From All Patronizing Insurers |
|---|
| disability insurance |
| auto collision insurance |

TABLE 6b-continued

Types of Insurance Available From All Patronizing Insurers auto liability insurance
life insurance
key-man insurance
malpractice insurance Therefore, the first piece of data sought in an application might be designed to identify the loan, line of credit or insurance policy that the applicant is seeking. For example, the first question put to an applicant might be "What loan, line of credit or insurance policy are you interested in—an accounts receivable loan, an auto loan, a home mortgage loan, a personal loan, a small business loan, a student loan, disability insurance, auto collision insurance, auto liability insurance, life insurance, key-man insurance or malpractice insurance?"

The subsequent data sought in the application advantageously enables data processing system 101 to determine whether the applicant satisfies the lending/insurance underwriting standards for the loan, line of credit or insurance policy sought, and if multiple lenders/insurers endeavor to provide loans, lines of credit, or insurance of that type, who the most appropriate lender/insurer is.

For example, if the application indicates that the applicant is interested in a "30-year, fixed-rate home mortgage loan," then data processing system 101 must ascertain whether the applicant is qualified for such a loan from either Lender A or Lender B or both (because both Lender A and Lender B endeavor to provide such loans). Alternatively, if the insurance application indicates that the applicant is interested in $300,000 coverage of auto liability insurance then data processing system 101 must ascertain whether the applicant is qualified for such coverage from either Insurer A or Insurer B or both (because both Insurer A and Insurer B endeavor to provide such insurance).

To this end, and given the underwriting standards Tables 4a and 5a, above, the following questions, among others, might be put to a loan applicant:

1) How much money do you want to borrow?
2) What is your income?
3) How long have you been at your current job?
4) What is the Postal ZIP Code for the home you are purchasing?

Similarly, given the underwriting standards of Tables 4b and 5b, the following questions, among others, might be put to an insurance applicant to determine if the applicant satisfies either or both underwriting standards:

1) How old are you?
2) How many points are on your license?
3) How long ago was your last moving violation?

Although question #3 is only relevant to the lending and/or insurance underwriting standard for Lender/Insurer B and loan question #4 and insurance question #2 are only relevant to the lending and/or insurance underwriting standard for Lender/Insurer A, both questions are advantageously asked and their answers received and stored in application database 252.

To reiterate, the data sought in an application is designed to enable data processing system 101 to match, if possible, each application from an applicant to the most appropriate lender/insurer, by, for example, cost and coverage.

At step 304, data processing system 101 compiles statistics on the applications received. Such statistics might include, but are not limited to:

the number of applications for each loan, line of credit or insurance policy received in a given interval;

the total dollar volume of applications received for each loan, line of credit or insurance policy; and any element of any application as a function of any other element—to answer questions such as "What is the total dollar volume of the applications received in the last 6 days from applicants seeking home mortgage loans for $200,000 or more in New Jersey?" or "What is the total dollar volume of the applications received in the last 6 days from applicants seeking auto liability insurance for $200,000 or more in New Jersey?"

It will be clear to those skilled in the art how to compile such statistics. Advantageously, step 304 is performed each time a new application is received by data processing system 101 or an application is amended or withdrawn.

The statistics compiled at step 304 are stored in statistical database 253 in data storage device 203. Because the statistics stored in statistical database 253 are valuable, they can be sold or provided as described below with respect to step 312.

At step 305, data processing system 101 compares each application received in step 303 to the lending and/or insurance underwriting standards stored in lending and/or insurance underwriting standard database 251 to identify, if possible, (1) a selected lender/insurer, and (2) a prioritized list of alternative lenders/insurers, including a first alternative lender/insurer.

In other words, data processing system 101 endeavors to find one or more lenders/insurers who, based on the lending and/or insurance underwriting standards in lending and/or insurance underwriting standard database 251 are satisfied by the application received in step 303. There are three possible outcomes of step 305:

1. The application does not satisfy the lending and/or insurance underwriting standards of any lender or insurer;

2. The application satisfies the lending and/or insurance underwriting standards of only one lender or insurer; or 3. The application satisfies the lending and/or insurance underwriting standards of two or more lenders or insurers.

In the example case of an applicant for a loan or line of credit, depending on the outcome of step 305, data processing system 101 then, at step 306, advantageously outputs:

i. (to the selected lender) an indicium of the identity of the applicant; or ii. (to the selected lender) the loan application to the selected lender; or iii. (to the applicant) an indicium of the identity of the selected lender; or iv. (to the applicant) an indicia of the interest rate, fees, and terms cited in the lending underwriting standard satisfied by the loan underwriting standard from the selected lender; or v. (to the applicant) an indicium of the identity of the alternative lenders; or vi. (to the applicant) an indicia of the interest rate, fees, and terms cited in the lending underwriting standard satisfied by the loan underwriting standard from each of the alternative lenders; or vii. any combination of i, ii, iii, iv, v, and vi.

Case #1—In the first case, when the application does not satisfy the lending and/or insurance underwriting standards of any lender and/or insurer, data processing system 101 informs the applicant of such (or the application processor or insurance agent if one is used). In some cases, data processing system 101 may inform the applicant of the reasons why the application is unsatisfactory.

As an example of the first case, assume that a loan applicant, Loan Applicant #1, provides the loan application depicted in Table 7a.

TABLE 7a

Loan Application from Applicant #1

| | |
|---|---|
| Type of Loan or Line of Credit Sought | Home Mortgage Loan |
| Amount of Loan | $211,000 |
| Income | $19,500 |
| Tenure at Job | 2 months |
| Postal ZIP Code for Home | 07920 |

By comparing the data in Table 7a to the underwriting standards in Tables 4a and 5a, it can be readily observed that Loan Applicant #1 does not satisfy the underwriting standards of either Lender A or Lender B. Therefore, data processing system 101 informs the loan applicant of such and advantageously also informs the loan applicant why his or her loan application did not satisfy any lender's underwriting standards.

As a second example of the first case, assume that an insurance applicant, Insurance applicant #1, provides the insurance application depicted in Table 7b.

TABLE 7b

Insurance Application from Insurance applicant #1

| | |
|---|---|
| Insurance Product Sought | Auto Liability Insurance |
| Amount of Coverage | $400,000 |
| Age of Insurance Applicant | 16 |
| Number of Points on License | 13 |
| Length of Time Since Last Moving Violation | 3 weeks |

By comparing the data in Table 7b to the underwriting standard in Tables 4b and 5b, it can be readily observed that insurance applicant #1 does not satisfy the underwriting standard of either Insurer A or Insurer B (the insurance applicant has too many points and its last moving violation was too recent).

Therefore, data processing system 101 informs the applicant of such and advantageously also informs the applicant why his or her application did not satisfy the lending and/or insurance underwriting standards of any lender and/or insurer.

Case #2—In the second case, when the application satisfies the lending and/or insurance underwriting standards of only one lender and/or insurer, that lender or insurer is designated as the "selected lender/insurer" by data processing system 101. In the case of insurance, for example, data processing system 101 then, at step 306, advantageously outputs:

i. (to the selected insurer) an indicium of the identity of the insurance applicant; or
ii. (to the selected insurer) all or a portion of the insurance application; or
iii. (to the insurance applicant) an indicium of the identity of the selected insurer; or
iv. (to the insurance applicant) an indicium of the premium, fees, and terms cited in the underwriting standard satisfied by the insurance application; or
v. any combination of i, ii, iii and iv.

The selected lender/insurer and the applicant then interact, either through data processing system 101 or not, as necessary or desirable, to close the loan, line of credit, or insurance policy (e.g., enter into a binding contract for insurance coverage). If the selected lender/insurer desires to engage the services of a loan processor (e.g., loan processor and/or underwriter 105) to facilitate the closing, that fact, and the identity of the loan processor and/or underwriter is conveyed to data processing system 101 and stored in netbacking database 255. The function performed by an underwriter in this case is to collect the appropriate documentation from the insurance applicant and to ensure that the data provided by the insurance applicant in the insurance application is, in fact, truthful, correct and complete. The purpose of keeping a record of whether a loan processor or underwriter is used is to ensure that the loan processor and/or underwriter is compensated for his or her service. This is discussed in detail below with respect to step 310.

As an example of the second case, assume that a loan applicant, Loan Applicant #2, provides the loan application depicted in Table 8a.

TABLE 8a

Loan Application from Loan Applicant #2

| | |
|---|---|
| Type of Loan or Line of Credit Sought | Home Mortgage Loan |
| Amount of Loan | $211,000 |
| Income | $95,000/year |
| Tenure at Job | 60 months |
| Postal ZIP Code for Home | 07920 |

By comparing the data in Table 8a to the underwriting standards in Tables 4a and 5a, it can be seen that Loan Applicant #2 satisfies the underwriting standards of Lender A for a loan of $211,000 (which is quoted at 7.25%). Furthermore, it can be seen that Loan Applicant #2 does not satisfy the underwriting standards of Lender B for a loan of $211,000 because Loan Applicant #2 has insufficient income ($95,000 is below the $100,000 per year required). Therefore, the loan application only satisfies the underwriting standards from Lender A and, therefore, data processing system 101 identifies Lender A as the selected lender.

As a second example of the second case, assume that an insurance applicant, Insurance applicant #2, provides the insurance application depicted in Table 8b.

TABLE 8b

Insurance application from Insurance applicant #2

| | |
|---|---|
| Insurance Product Sought | Auto Liability Insurance |
| Amount of Coverage | $600,000 |
| Age of Insurance Applicant | 26 |
| Number of Points on License | 3 |
| Length of Time Since Last Moving Violation | 9 years ago |

By comparing the data in Table 8b to the underwriting standard in Tables 4b and 5b, it can be seen that Insurance Applicant #2 satisfies the underwriting standard of Insurer A for $600,000 of coverage (which is quoted at $0.45 per month per thousand dollars of coverage). Furthermore, it can be seen that Insurance applicant #2 does not satisfy the underwriting standard of Insurer B for coverage of $600,000 because Insurance applicant #2 is too young (26 years of age is below the 27 years of age required for more than $500,000 in coverage). Therefore, the insurance application only satisfies the underwriting standard from Insurer A and, therefore, data processing system 101 identifies Insurer A as the selected insurer.

Whether the selected lender/insurer and applicant communicate solely through data processing system 101 to close the loan or line of credit or write the insurance policy, data processing system 101 advantageously tracks the progress of each application, all lender/insurer and applicant communications, document processing steps, closing rates or written policies as a percentage of applications referred, and the resulting billings and receipts of the parties. This is useful for, among other things, ensuring that parties do not receive the benefit of data processing system 101 without paying for it.

Furthermore, data processing system 101 maintains a permanent record of the closing attributes for each loan, line of credit, and/or insurance policy in closing attributes database 257. For the purposes of this specification, the term "closing attributes" is defined as those attributes of the application and the underwriting standard for the loan, line of credit and/or insurance policy that might be useful at a later time to cost/value or reinsure that loan, line of credit and/or insurance policy. The purpose of maintaining the closing attributes for each loan, line of credit and/or insurance policy is discussed below with respect steps 313 to 315.

Case #3—In the third case, when the application satisfies the lending and/or insurance underwriting standards of two or more lenders/insurers, data processing system 101 identifies one of those lenders/insurers whose lending and/or insurance underwriting standards are satisfied as the selected lender/insurer and the remaining lenders/insurers as alternative lenders/insurers. Of the lenders/insurers whose lending and/or insurance underwriting standards are satisfied, that lender/insurer that cites the lowest interest rate or insurance premium and fees and the best terms for the loan, line of credit, or insurance is identified as the selected lender/insurer.

If there are two or more lenders/insurers whose lending and/or insurance underwriting standards are satisfied by the application and that offer a different combination of interest rates, fees, and terms for a given loan or line of credit, data processing system 101 can select them both as co-selected lenders. In this case, the applicant might be given the option of which he or she desires to deal with. In another alternative, if there are two or more lenders/insurers whose lending and/or insurance underwriting standards are satisfied by the application and that offer the same interest rate, insurance premium, fees, and terms for a given loan, line of credit or insurance policy, data processing system 101 advantageously selects the chronologically first to offer the interest rate, set of premiums, fees, and terms as the selected lender/insurer. This convention further induces lenders/insurers to lower their interest rates, premiums and/or fees quickly and to improve their terms, which contributes to the efficiency of the market. In another alternative, if there are two or more lenders/insurers for whom the applicant qualifies, that offer the same premium, fees, and terms for a given insurance product, data processing system 101 can alternately designate one insurer and then the others, in round-robin fashion, as the selected insurer. And as a third alternative, if there are more than two insurers whose underwriting standards are satisfied by the insurance application and that offer the same premium, fees, and terms for a given insurance product, data processing system 101 can randomly designate one insurer as the selected insurer.

The first alternative lender/insurer is that lender or insurer of all of the lenders/insurers whose lending and/or insurance underwriting standards are satisfied by the application, and that offers the next-most-advantageous interest rates and fees or terms for the loan or line of credit, or the next best premiums, fees and terms for the solicited insurance. The second and subsequent alternative lenders/insurers are identified similarly.

The utility of identifying alternative lender/insurers arises when, for any reason, the selected lender/insurer is unable or unwilling to provide the loan, line of credit, or insurance policy despite the lending and/or insurance underwriting standard to the contrary. If the selected lender/insurer fails to provide a loan, line of credit or insurance (through no fault of the insurance applicant), then the selected lender/insurer might be "punished" by a cash fine payable to either the owner of data processing system 101 or to the disappointed applicant or both. In the event that a selected lender/insurer does not provide the loan, line or credit or insurance, it is stricken as the selected lender/insurer and the first alternative lender/insurer is promoted and becomes identified as the selected lender/insurer. The newly identified selected lender/insurer and the applicant then endeavors to close the loan, line of credit, or insurance policy. In the example of an application for insurance, data processing system 101 then, at step 306, advantageously outputs:

i. (to the selected insurer) an indicium of the identity of the applicant; or ii. (to the selected insurer) all or a portion of the insurance application; or iii. (to the applicant) an indicium of the identity of the selected insurer; or iv. (to the applicant) an indicium of the premium, fees, and terms cited in the underwriting standard satisfied by the insurance application; or v. (to the applicant) an indicium of the identity of the alternative insurers; or vi. (to the applicant) an indicium of the premium, fees, and terms cited in the underwriting standard satisfied by the insurance underwriting standard from each of the alternative insurers; or vii. any combination of i, ii, iii, iv, v, and vii.

As an example of the third case, assume that a loan applicant, Loan Applicant #3, provides the loan application depicted in Table 9a.

TABLE 9a

| Loan Application from Loan Applicant #2 | |
|---|---|
| Type of Loan or Line of Credit Sought | Home Mortgage Loan |
| Amount of Loan | $135,000 |
| Income | $80,000/year |
| Tenure at Job | 30 months |
| Postal ZIP Code for Home | 07701 |

By comparing the data in Table 9a to the underwriting standards in Tables 4a and 5a, it can be seen that Loan Applicant #3 satisfies the underwriting standards for both Lender A and Lender B. For such a loan, Lender A quotes a 7.20% interest rate and Lender B quotes 7.25%. Therefore, because the interest rate cited by Lender A is lower than that of Lender B, data processing system 101 identifies Lender A as the selected lender and Lender B as the first alternative lender (assuming that the other fees and terms are comparable).

As another example of the third case, assume that an insurance applicant, Insurance Applicant #3, provides the insurance application depicted in Table 9b.

TABLE 9b

| Insurance Application from Insurance Applicant #2 | |
| --- | --- |
| Insurance Product Sought | Auto Liability Insurance |
| Amount of Coverage | $100,000 |
| Age of Insurance Applicant | 46 |
| Number of Points on License | 0 |
| Length of Time Since Last Moving Violation | 9 years ago |

By comparing the data in Table 9b to the underwriting standard in Tables 4b and 5b, it can be seen that Insurance applicant #3 satisfies the underwriting standard for both Insurer A and Insurer B. For such an insurance application, Insurer A quotes a $1.47 premium and Insurer B quotes $1.81 premium. Therefore, because the insurance premium quoted by Insurer A is lower than that of Insurer B, data processing system 101 identifies Insurer A as the selected insurer and Insurer B as the first alternative insurer (assuming that the other fees and terms are comparable).

At step 307, data processing system 101 compiles statistics on the matching of applications to lending and/or insurance underwriting standards, and of the failure to match applications to lending and/or insurance underwriting standards. Such statistics might include, but are not limited to:

the number of matches for each loan, line of credit or insurance policy in a given interval;

the total dollar volume of the matches for each loan, line of credit or insurance policy; and any aspect of any match as a function of any other aspect—to answer questions such as "What is the average interest rate of the matches made in the last hour for auto loans in California?" or "What is the average insurance premium of the matches made in the last hour from insurance applicants seeking auto liability insurance in California who are 21 years old?"

It will be clear to those skilled in the art how to compile such statistics. Advantageously, step 307 is performed each time a match is made between an application and a lending and/or insurance underwriting standard and each time there is a failure to match an application to a lending and/or insurance underwriting standard.

The statistics compiled at step 307 are stored in statistical database 253 in data storage device 203. Because the statistics stored in statistical database 253 are valuable, they can be sold or provided as described below with respect to step 312.

At step 308, data processing system 101 receives a statement of the fee incurred by each patron (e.g., the selected lender, the applicant, etc.) associated with the transaction, which fee is correspondingly earned by the owner/operator of data processing system 101. Advantageously, the fee is incurred by the selected lender or insurer when the loan, credit line or insurance is closed. No fee is incurred by the applicant. In an alternative embodiment, the fee is incurred in step 306 by the selected lender for merely introducing the selected lender/insurer and the applicant. In another alternative embodiment, the fee is incurred by the applicant. In yet another alternative embodiment, a fee is incurred by the selected lender and a fee is incurred by the applicant.

Advantageously, the fee is based on the dollar volume of the loan or line of credit, or policy written or on the size of the premiums, or both, and the amount of the fee incurred is stored in earned fee database 254 in data storage device 203. The fee information is valuable because it enables data processing system 101 to determine how to distribute, remit and credit the aggregate fees and to price the statistics in statistics database 253. More is said about this in steps 309 through 312.

At step 309, data processing system 101 compiles statistics on the fees incurred, if any, from each applicant and lender/insurer. Such statistics might include, but are not limited to:

the aggregate fees incurred by a given lender in a given interval;

a measure of the aggregate fees incurred in a given interval from transactions in which a given insurer has provided the insurance;

the aggregate fees incurred by all lenders in a given interval in which a given application processor has prepared the loan application;

the aggregate fees incurred by all lenders in a given interval in which a given loan processor has facilitated the closing of a loan or line of credit; and the aggregate fees incurred by a given lender in a given interval in which the lender has acted as his or her own loan processor;

the aggregate fees incurred as a function of any aspect of any lending and/or insurance underwriting standard or application—to answer questions such as "What are the aggregate fees incurred on applications for home mortgage loans for $200,000 or more in New Jersey in the last 28 days?" or "What are the fees incurred on applications for auto liability insurance for $200,000 or more in New Jersey in the last 28 days?"

It will be clear to those skilled in the art how to compile such statistics. Advantageously, step 309 is performed each time a statement of an incurred fee is received by data processing system 101 (step 308).

The statistics compiled at step 309 are stored in statistical database 253 in data storage device 203. Because the statistics stored in statistical database 253 are valuable, they can be sold or provided as described below with respect to step 312.

At step 310, data processing system 101 computes and outputs an indicium of the portion of the fee incurred in step 308 by each of:

(1) the applicant;

(2) the application processor or insurance agent, if one was used; and (3) the loan processor and/or underwriter, if one was used.

In all cases, the remittance of some portion of the incurred fee to each of these parties is made not only to compensate the party for the services they have performed, but also to encourage and reward the parties for facilitating the closing of loans, lines of credit and/or insurance policies through data processing system 101 (which contributes to the efficiency of the overall market).

With regard to the applicant, a portion of the fee incurred by the lender/insurer might be provided to the applicant based on the total dollar volume of loans, lines of credit or insurance policies that the applicant has received through data processing system 101 in a given interval (e.g., the total fees earned from three transactions in which the insurance applicant gets auto insurance, health insurance and homeowners insurance through data processing system 101 from three different insurers, etc.). In other words, the applicant should be rewarded for his or her patronage of data processing system 101. The statistics compiled in step 309 are useful in determining the amount of the fee incurred by the applicant.

Furthermore, if the applicant acts as his or her own application processor or insurance agent, then the applicant lowers the cost of doing business for the lender/insurer and should be rewarded for doing so. Therefore, the remittance of a portion of the incurred fee to the applicant encourages the applicant to act as his or her own application processor or insurance agent.

With regard to an application processor or insurance agent who acts as an agent for the applicant (if one is engaged with regard to a particular application), a portion of the incurred fee is remitted back to the application processor or insurance agent for his or her service in assisting the applicant in preparing the application. Furthermore, because the application processor or insurance agent and not the applicant might make the decision to patronize data processing system 101, the application processor or insurance agent is advantageously also provided an additional portion of the incurred fee as an origination fee for choosing data processing system 101. The origination fee might vary, for example, based on the total dollar volume of the loans and lines of credit closed in which the application processor is involved. The statistics compiled in step 309 are useful in determining the amount of the fee incurred by the application processor or insurance agent.

With regard to the loan processor and/or underwriter (if one is engaged with regard to a particular loan, line of credit or insurance policy), a portion of the incurred fee is remitted back to the loan processor and/or underwriter for his or her service in facilitating the closing of the loan, line of credit, or insurance policy. Furthermore, to encourage the loan processor and/or underwriter to expedite the closing of the loan, line of credit or insurance policy involving data processing system 101, an additional portion of the incurred fee is advantageously provided to the loan processor and/or underwriter based on the total dollar volume of the loans, lines of credit or insurance policies closed in which the loan processor and/or underwriter is involved. The statistics compiled in step 309 are useful in determining the amount of the fee to be remitted to the loan processor and/or underwriter.

As shown in FIG. 5, at step 311, data processing system 101 outputs an indicium of a portion of the fee, if any, to be remitted back to the selected lender or insurer. The purpose of remitting a portion of the fee back to the selected lender/insurer is to encourage the selected lender or insurer to:

(i) patronize data processing system 101;

(ii) offer the widest variety of loans, lines of credit and/or insurance products at the lowest interest rates or insurance premiums and fees and with the best terms; and (iii) close the largest number of loans, lines of credit and/or insurance policies possible through the system.

To this end, the amount of the fee to be remitted back is advantageously dependent on: (i) the measure of fees incurred by data processing system 101 from transactions in a given interval in which the lender/insurer has provided the loans, lines of credit, or insurance, and (ii) a graduated schedule (e.g., Table 1 above, etc.). For example, if less than $1,000,000 in fees are incurred by a given lender or insurer within the last month, then only 15% of the incurred fee is remitted back to the lender/insurer. In contrast, if more than $5,000,000 in fees are incurred by a given lender or insurer within the last month, then 35% of the incurred fee is remitted. The statistics compiled in step 309 are useful in determining the amount of the fee to be remitted back to the selected lender/insurer.

Furthermore, at step 311, data processing system 101 outputs one or more of the following:

i. an indicium of a portion of the fees incurred with respect to the primary market and with respect to each lender to be credited to each lender, which credit can be applied against the fees incurred by the lender in the secondary market;

ii. an indicium of a portion of the fee, if any, to be credited to each insurer, which credit can be applied against the fees incurred by the insurer in reinsuring (i.e., being either the reinsurer, the reinsured or both) through data processing system 101;

iii. an indicium of a portion of the fees incurred with respect to the secondary market and with respect to each lender to be credited to each lender, which credit can be applied against the fees incurred by the lender in the primary market; and iv. an indicium of the price to be paid by each lender and statistics subscriber for the statistics output in step 312 and an indicium of the terms and nature of the statistics output in step 312.

The purpose of crediting a portion of the fee in one market to the other is to further encourage the lender/insurer to:

(i) patronize data processing system 101;

(ii) offer the widest variety of loan or insurance products at the lowest interest rates or insurance premiums and fees and with the best terms;

(iii) close the largest number of loans, lines of credit and/or insurance policies possible with the assistance of data processing system 101; and (iv) buy and/or sell loans and pools of loans and/or reinsure through data processing system 101.

Furthermore, by changing the amount of the fees in one market that can be credited against the fees in the other, data processing system 101 is able to affect the efficiency of both the primary and the secondary markets.

The amount of the fee to be remitted back is also advantageously dependent on: (i) the measure of fees incurred by data processing system 101 from transactions in a given interval in which the lender/insurer has provided the loans, lines of credit, or insurance, and (ii) a graduated schedule (e.g., Table 3 above, etc.). It will be clear to those skilled in the art how to compute and output an indicium of the fee to be remitted back to each lender/insurer and how to compute and output an indicium of the fee to be credited to each lender/insurer against fees incurred for buying and/or selling loans and pools of loans and/or reinsuring risks through data processing system 101.

At step 312, data processing system 101 outputs some or all of the statistics (regarding the primary market or the secondary market) stored in statistics database 253. It will be clear to those skilled in the art that the "statistics" provided can include raw data as well as information about the raw data. Advantageously, some parties are given the statistics in real-time, while others are given them delayed by some duration (e.g., 15 minutes, 24 hours, etc.). Typically, the statistics in real-time will be considered more valuable than the statistics that are delayed. Furthermore, some parties might be given more statistics than others.

Although some or all of the statistics can be sold for cash to the statistics subscribers (e.g., a newspaper, a financial analyst, etc.), the statistics are advantageously given for free or at a subsidized price to those patrons (e.g., the lenders, applicants, buyers and/or sellers of loans, insurers, reinsurers, reinsureds, etc.) who actually close loans and/or lines of credit, buy or sell loans, write policies, and/or reinsure through data processing system 101. In particular, the price of the statistics for a given patron advantageously decreases as a measure of the fees incurred with respect to all transactions (in both the primary and secondary markets) associated with that patron increase. The decision whether to output statistics to a patron in real-time or not and for free or for a subsidized twice is advantageously made based on the amount of fees incurred by transactions involving that patron in a given interval., which is considered one indication of how much that patron has contributed to the efficiency of the market on data processing system 101. The data stored in earned fee database 254 and netbacking database 255 are useful for this purpose.

In steps 313 through 319, data processing system 101 functions as a market for the buying and selling of loans between buyers and sellers of loans, and/or the reinsurance of risk between reinsurers and reinsureds, for which each party incurs a fee, which is paid to the owner/operator of data processing system 101. In general, it will be to the advantage of the buyers and/or sellers of loans, reinsurers, and/or reinsureds if they base their bids and offers to trade or reinsure at least partially on the statistics output to them in step 312. Otherwise, they are likely to be arbitraged by other entities that do.

Advantageously, the offers to sell and the bids to purchase are based on the statistics output to the buyers and/or sellers of loans in step 312. Furthermore, the fees incurred by a buyer and/or seller of loans for buying and/or selling loans through data processing system 101, or fees incurred by reinsurers and reinsureds for reinsuring through data processing system 101 are advantageously considered by data processing system 101 in determining the price, timeliness, and completeness of the statistics offered to the buyer and/or seller of loans or reinsurer in step 312.

At step 313, data processing system 101 receives an offer to sell one or more loans, or a bid to buy reinsurance at an offering price from a buyer and/or seller of loans or from each of a plurality of reinsurers. Advantageously, each offer either:

1) describes each loan or insurance policy in terms of its closing attributes, or
2) identifies each loan or insurance policy for which reinsurance is sought so that a potential bidder or reinsurer can retrieve the loan's or policy's closing attributes from closing attributes database 257.

In either case, this facilitates the sale of pools of heterogeneous loans and/or reinsurance of policies by enabling each potential purchaser or reinsurer to evaluate the cost/value of each loan or insurance policy in the pool by his or her own standards. Furthermore, the offering price quoted for each loan or pool of loans is advantageously based on the statistics received by the buyer and/or seller of loans in step 312.

At step 314, data processing system 101 compiles statistics on the loan or pool of loans offered for sale and/or the bids to buy reinsurance in step 313. The statistics might include, but are not limited to:

What is the total dollar volume of all of the pools of loans offered for sale?

What is the total dollar volume of all of the reinsurance bid to buy?

Any function of the offer to sell as a function of any other function—to answer questions such as "What is the lowest price offered for a pool of 100 home mortgage loans in New Jersey to borrowers who earn more than $65,000 per year?" or "What is the lowest premium bid to assume 10% of the liability in a pool of 100 flood insurance policies in New Jersey to insureds who live on flood plains?"

It will be clear to those skilled in the art how to compile such statistics, which are stored in statistics database 253. Advantageously, the statistics are re-compiled each time a new offer is received to sell a loan or pool of loans, or a new bid to buy is received from a reinsured.

The statistics compiled at step 314 are stored in statistical database 253 in data storage device 203. Because the statistics stored in statistical database 253 are valuable, they can be sold or provided as described with respect to step 312.

At step 315, data processing system 101 receives an offer to buy one or more loans at a bid price from each of a plurality of potential buyers of loans, and/or an offer to reinsure at an offering price from each of a plurality of reinsureds. Advantageously, the offer specifies the minimum closing attributes for each loan, or for each of the insurance policies that the reinsurer is willing to reinsure, and the offer price is based by the buyer or reinsurer on the statistics received by the buyer or reinsurer in step 312.

At step 316, data processing system 101 compiles statistics on the offers to buy or sell received in step 315. The statistics might include, but are not limited to:

What is the total dollar volume of all of the reinsurance offered to be sold?

Any function of the offer to sell or buy as a function of any other function—to answer questions such as "What is the highest price offered for a pool of 100 home mortgage loans in New Jersey to borrowers who earn more than $65,000 per year?" or as "What is the lowest price offered for 20% liability for a pool of 400 flood policies in New York to insureds who live on flood plains?"

It will be clear to those skilled in the art how to compile such statistics, which are stored in statistics database 253. Advantageously, the statistics are re-compiled each time a new offer is received to buy a loan or pool of loans or a new offer to sell is received by a reinsurer.

The statistics compiled at step 316 are stored in statistical database 253 in data storage device 203. Because the statistics stored in statistical database 253 are valuable, they can be sold or provided as described with respect to step 312.

At step 317, data processing system 101 compares each offer to sell a loan or pool of loans or bid to buy reinsurance, to each offer to buy a loan or pool of loans or to sell reinsurance to identify, if possible, a match between a buyer or reinsurer and a seller or reinsured. It will be clear to those skilled in the art how to compare each bid to buy with each offer to sell.

At step 318, if a match between a seller and a buyer is found for a loan or pool of loans or a match between a reinsured and reinsurer is found for the reinsurance of one or more policies, that fact is output from data processing system 101 to both the buyer/reinsurer and the seller/reinsured so that the loan sale or reinsurance contract can be consummated.

At step 319, data processing system 101 compiles statistics on sale of the loan or pool of loans or reinsurance in step 318. The statistics might include, but are not limited to:

What is the total dollar volume of all of the loans or reinsurance sold in the last 24 hours?

Any function of the sale to buy as a function of any other function—to answer questions such as "What is last price given for a pool of 100 home mortgage loans in New Jersey to borrowers who earn more than $65,000 per year?"

Any function of any reinsurance consummated as a function of any other function—to answer questions such as "What is last price paid to reinsure a pool of 100 auto liability policies in New Jersey to insureds who are 21 years old?"

It will be clear to those skilled in the art how to compile such statistics, which are stored in statistics database 253.

Advantageously, the statistics are re-compiled each time a new sale of a loan or a deal for reinsurance is consummated.

The statistics compiled at step 316 are stored in statistical database 253 in data storage device 203. Because the statistics stored in statistical database 253 are valuable, they can be sold or provided as described with respect to step 312.

At step 320, data processing system 101 receives a statement of the fee incurred for sale of a loan or loans or the brokering the reinsurance. Advantageously, the fee is incurred by both the buyer and the seller of the loan or loans, or by both the reinsurer and reinsured. In an alternative embodiment, the fee is incurred only from the seller of the loan or loans or from the reinsured. In an alternative embodiment, the fee is incurred only by the buyer of the loan or loans or by the reinsurer.

Advantageously, the fee is based on the dollar volume of the loan pool trade or reinsurance transaction, and the indication of the fee incurred is stored in earned fee database 254 in data storage device 203. The fee information is valuable because it enables data processing system 101 to determine how to distribute the aggregate fees and the statistics in statistics database 253 among the various lenders/insurers, loan or insurance applicants, insurance agents, application processors, reinsurers, reinsureds, underwriters, loan processors, and the owner of data processing system 101.

As stated above with respect to step 311, a portion of the fees incurred in step 320 can be offset by the credit earned in step 311.

After step 320, control figuratively passes to step 301, although it will be clear to those skilled in the art that the steps in FIGS. 4 and 5 need not be performed in order. Rather, many of the steps are advantageously performed in parallel in response to the submissions of lending underwriting standards, loan applications, offers to sell and offers to buy individual loans and pools of loans, underwriting standards, insurance applications, offers to sell and offers to buy reinsurance.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A method, comprising the steps of:
    in a market for loans or lines of credit offered to consumers in which transactions occur among market participants in distinct first and second sectors, providing intermediation services for transactions in each of the two sectors;
    the first sector being origination of the loans or lines of credit, the intermediation services in the first sector including:
    during an application process for loans or lines of credit offered by a plurality of offerors, obtaining information describing applications made by a plurality of applicants for the loans or lines of credit, the information relating to the qualifications of the applicants relative to underwriting standards of a plurality of lenders;
    receiving application data records from a plurality of applicants at a data processing system having a program executing computer, a data storage device, and an output device and storing the application data records in a database in said data storage device;
    executing computer programs on said data processing system for:
    storing the application data records in said database;
    submitting the obtained information for matching against underwriting standards of the offerors;
    matching the applicants' information against underwriting standards of a plurality of lenders, and identifying to each applicant, from among those lenders having underwriting standards that the respective applicant meets, an indicium of the identity of the lender that has the best combination of low interest rate and fees; and
    essentially contemporaneously with the closing of each of a plurality of the loans or lines of credit, updating the database with information describing the closed loans or lines of credit; and
    the second sector being a secondary market for buying and selling of the loans or lines of credit, the intermediation services in the second sector including:
    providing intermediation services in the second sector pursuant to a predetermined pricing schedule providing credits for transaction fees paid by a party for intermediation of transactions in the first sector for redemption against fees payable by the party for intermediation of transactions in the second sector;
    offering to parties in the second sector real-time or near real-time access to the information in the database, the offer being under a prearranged pricing schedule providing reductions in the price of the information as fees increase for intermediation services provided for transactions in the first sector.

2. A method of providing intermediation services, the method comprising the steps of:
    receiving transaction data records from a plurality of parties at a data processing system having a program executing computer, a data storage device, and an output device and storing the transaction data records in said data storage device;
    executing computer programs on said data processing system for:
    generating a pricing schedule for intermediation services, the schedule providing credits for transaction fees paid by a party for intermediation of transactions in a first sector for redemption against fees payable by the party for intermediation of transactions in a second sector, the first and second sectors respectively being origination and secondary trading of products of a class of financial products in which transactions for the products occur among market participants in the first sector, distinctly, and the second sector, distinctly; and
    providing computerized intermediation services according to the pricing schedule for transactions in each of the sectors.

3. The method of claim 2, further comprising the steps of offering information for sale to parties conducting transactions in one of the first and the second sectors, the information being captured in providing the intermediation services, the offering being under a pricing schedule providing price reductions for the information as fees increase for intermediation services provided for transactions.

4. The method of claim 2, wherein
the pricing schedule provides that transaction fees for the intermediation of transactions in the second sector are to be credited against an access fee for research information describing the financial products.

5. The method of claim 2, further comprising the step of
offering information for sale to market participants in the first sector, the information being information captured in providing the intermediation services in the second sector.

6. The method of claim 2, wherein the financial products are lines of credit.

7. The method of claim 2, wherein the financial products are commercial loans.

8. The method of claim 2, wherein the first market sector is origination of insurance, and the second sector is reinsurance.

9. The method of claim 2, further comprising the step of
offering information for sale to market participants in the second sector, the information being captured in providing the intermediation services in the first sector.

10. The method of claim 9, further comprising the step of
structuring a pricing schedule for the information wherein the credits are applicable to reduce a cost of the information.

11. The method of claim 2, wherein the financial products are loans or lines of credit.

12. The method of claim 11, wherein the loans are mortgages.

13. The method of claim 11, wherein the loans are automobile loans.

14. The method of claim 11, wherein the loans are personal loans.

15. The method of claim 11, wherein the credits expire if not redeemed within a specified time period.

16. The method of claim 11, wherein the first sector is an origination market for the loans or lines of credit, and the second sector is a wholesale secondary market on which the loans or lines of credit are traded.

17. The method of claim 16, further comprising the steps of
obtaining, from a loan applicant, information relating to qualifications of the loan applicant relative to underwriting standards of a lender for origination of a loan; and
matching the information against underwriting standards of a plurality of lenders.

18. The method of claim 17, further comprising the step of
identifying to the loan applicant, from among the lenders having underwriting standards that the loan applicant meets, an indicium of identity of the lender that has a best combination of low interest rate and fees.

19. The method of claim 17, further comprising the step of
identifying to the loan applicant, from among the lenders having underwriting standards satisfied by the loan applicant, a list of alternative lenders prioritized by a combination of low interest rate and fees.

20. The method of claim 11, further comprising the steps of:
obtaining, from a loan applicant, information relating to qualifications of the loan applicant relative to underwriting standards of a lender for origination of a loan; and
storing the obtained information in a database for future disclosure to other market participants.

21. The method of claim 20, further comprising the step of
storing, in the database, the obtained information upon completion of a loan application.

22. The method of claim 20, further comprising the step of
updating the database to reflect terms of the loan as closed between the loan applicant and the lender.

23. Apparatus comprising:
a data processing system having a program executing computer, a data storage device, and an output device and one or more programs to provide intermediation data processing functions;
said data processing system including programs executing on said program executing computer that record credits for transaction fees paid by a party for intermediation of transactions in a first sector for redemption against fees payable by the party for intermediation of transactions in a second sector, the first and second sectors respectively being origination and secondary trading of products of a class of financial products in which transactions for the products occur among market participants in the first sector, distinctly, and second sector, distinctly.

24. The apparatus of claim 23, wherein
the data processing system records fees according to a pricing schedule that provides for reduced pricing for access by a party to research information describing the financial products, the reduced pricing based on increased transaction volume achieved over a time period by the party.

25. The apparatus of claim 23, wherein the credits expire if not redeemed within a specified time period.

26. The apparatus of claim 23, wherein
the data processing system is executing the one or more programs to receive information describing applications for the financial products, to update the database with information describing the applications essentially contemporaneously with respective completion of the applications, and
to provide an interface making the database available to parties in a secondary market for the financial products according to a pricing schedule.

27. The apparatus of claim 23, wherein:
the data processing system is executing the one or more programs to obtain information from an applicant for one of the financial products, the information relating to qualifications of the applicant relative to offering underwriting standards of a plurality of offerors, for origination of the one of the financial products and
to match the information against the offering underwriting standards, and to identify to the applicant, from among those of the offerors having offering underwriting standards that the applicant meets, an indicium of identity of the offeror that has a best combination of low interest rate and fees.

28. The apparatus of claim 23, wherein
the data processing system is executing the one or more programs to offer information for sale to market participants in the second sector, the information being captured in providing intermediation services in the first sector.

29. The apparatus of claim 23, wherein
the data processing system is executing the one or more programs to record a portion of the fees recorded for intermediation of transactions in the second sector as credits for redemption against transaction fees for transactions in the first sector.

30. The apparatus of claim 23, wherein the first sector is origination of insurance.

31. The apparatus of claim 23, wherein
the data processing system is executing the one or more programs to obtain information from respective applicants seeking the financial products, the information relating to qualifications of the respective applicants relative to underwriting standards of a plurality of offerors, for origination of the financial products, to store the information in a database, and to match the information against the standards of the plurality of offerors.

32. The apparatus of claim 31, wherein the financial products are loans to or lines of credit for consumers.

33. The apparatus of claim 31, wherein the data processing system is executing the one or more programs to receive the information essentially contemporaneously with the completion of respective applications for the financial products and to provide an interface making the database available to computers of parties in a market for the financial products.

34. The apparatus of claim 31, wherein the data processing system is executing the one or more programs to identify to one of the applicants, from among the offerors having underwriting standards that the one applicant meets, an indicium of identity of the offeror that has a best combination of low price and best terms.

35. A method of intermediation services, the method comprising the steps of:

providing, by a computer system having a program executing computer, a data storage device, and an output device, intermediation services for intermediation of transactions in each of a first sector and a second sector, the first and second sectors respectively being origination and secondary trading of products of a class of financial products in which transactions for the products occur among market participants in the first sector, distinctly, and second sector, distinctly;

receiving transaction data records from a plurality of parties at the computer system and storing the transaction data records in said data storage device;

executing computer programs on said data processing system for:

offering, by the computer system, information for sale to parties conducting transactions in the second sector, some of the information being captured in providing the intermediation services in the first sector, the offering being carried out according to a pricing schedule generated to provide price reductions for the information as fees increase for intermediation services.

36. The method of claim 35, wherein:

the first sector is an origination market for loans or lines of credit to be let to consumers, and the second sector is a secondary market for buying and selling of the loans or lines of credit;

and the providing of the intermediation services for buying and selling the loans or lines of credit is carried out according to a pricing schedule providing that transaction fees paid by a party for intermediation of transactions are to be credited against fees payable by the party for intermediation for other transactions, and providing for reduced pricing for access by a party to research information describing the loans or lines of credit, the price reduction based on increased transaction volume achieved over a time period by the party to the research information.

37. The method of claim 35, wherein the first sector is origination of insurance.

38. The method of claim 35, further including the steps of providing the intermediation services for intermediation according to a pricing schedule wherein transaction fees paid by a party for intermediation of transactions in the first sector are to be credited against fees payable by the party for intermediation of transactions in the second sector.

39. The method of claim 38, wherein credits expire if not redeemed within a specified time period.

40. The method of claim 35, wherein:

the information includes application information for the financial products obtained from applicants for matching against underwriting standards of a plurality of offerors of the financial products, the information being stored in a database.

41. The method of claim 40, further comprising the step of:

updating, essentially contemporaneously with closing each of a plurality of the financial products, the database with information describing closed financial products.

42. The method of claim 41, wherein:

the financial products are loans or lines of credit offered to consumers by a plurality of offerors; and the providing of the intermediation services in the first sector includes the steps of:

obtaining, during an application process for loans or lines of credit, applicant information describing each application made by each of a plurality of applicants for the loans or lines of credit, the applicant information relating to qualifications relative to underwriting standards of a plurality of lenders;

matching the applicant information against the underwriting standards, and identifying to each said applicant, from among those of the lenders having underwriting standards that the respective applicant meets, an indicium of identity of the lender that has a best combination of low interest rate and fees; and updating, essentially contemporaneously with closing of each of a plurality of the loans or lines of credit, the database with information describing closed loans or lines of credit; and the providing of the intermediation services includes:

providing intermediation services in the second sector pursuant to a pricing schedule providing credits for transaction fees paid by a party for intermediation of transactions in the first sector for redemption against fees payable by the party for intermediation of transactions in the second sector; and offering to parties in the second sector real-time or near real-time access to some of the information in the database.

43. The method of claim 40, further comprising the step of:

updating, essentially contemporaneously with completion of each of a plurality of applications for the financial products, the database.

44. The method of claim 35, wherein the financial products are loans or lines of credit to consumers.

45. The method of claim 44, wherein the information includes a lowest interest rate offered by any lender to a loan applicant meeting a profile specified by a party purchasing the information.

46. The method of claim 44, wherein the information includes a volume of loan applications meeting a profile specified by a party purchasing the information.

47. The method of claim 44, wherein the information includes a statistical characterization of loans closed, the loans meeting a profile specified by a party purchasing the information.

48. The method of claim 44, wherein
the information includes a statistical characterization of loan pools traded, the pools meeting a profile specified by a party purchasing the information.

49. The method of claim 44, wherein the first sector is an origination sector for the loans or lines of credit, and the second sector is a wholesale secondary market for buying and selling of the loans or lines of credit.

50. The method of claim 49, further comprising the step of storing in the database loan applicant information for loans not closed between a loan applicant and a lender.

51. The method of claim 49, further comprising the steps of:
obtaining applicant information relating to qualifications of an applicant relative to underwriting standards of a lender for origination of a loan or line of credit; and
matching the applicant information against underwriting standards of a plurality of lenders.

52. The method of claim 51, further comprising the step of identifying to the applicant, from among those lenders having underwriting standards satisfied by the applicant, an indicium of identity of the lender that has a best combination of low interest rate and fees and best terms.

53. A system comprising:
a data processing system having at least one program executing computer, a data storage device, and an output device programmed to provide intermediation data processing for transactions in a class of financial products in distinct first and second sectors, the first and second sectors respectively being origination and secondary trading of products of the class among market participants and
programs executing on said program executing computer to provide access to information to parties conducting transactions in the second sector and to record charges for the access, some of the information being captured in providing intermediation services in the first sector and offered under a pricing schedule generated to provide price reductions for the information as fees increase for the intermediation services provided for transactions in the first sector.

54. The system of claim 53, wherein
the at least one program executing computer is programmed to obtain application information for one of the financial products, the application information relating to qualifications of an applicant relative to underwriting standards of a plurality of each of offerors, for origination of the one of the financial products and
to match the application information against the underwriting standards, and to identify, from among those of the offerors having underwriting standards that the applicant meets, an indicium of identity of the offeror that has a combination of low interest rate and fees.

55. The system of claim 53, wherein
the at least one program executing computer is programmed to record fees due for the intermediation services in both of the sectors and
to record a portion of fees recorded for the intermediation of transactions in the first sector as credits for redemption against transaction fees for transactions in the second sector, according to a pricing schedule.

56. The system of claim 53, wherein
the at least one program executing computer is programmed to record transaction fees for the intermediation services provided to the parties, according to a pricing schedule providing that transaction fees paid by a party for intermediation of transactions are to be credited against fees payable by the party for intermediation for other transactions, and to provide a price reduction for access by a party to research information describing the financial products, the price reduction based on increased transaction volume achieved over a time period by the party requesting access to the research information.

57. The system of claim 53, wherein the at least one program executing computer is programmed
to record fees due for the intermediation services rendered in both sectors and,
according to a pricing schedule, to record a portion of fees recorded for the intermediation of transactions in the first sector as credits for redemption against transaction fees for transactions in the second sector.

58. The system of claim 53, wherein the financial products are loans or lines of credit.

59. The system of claim 53, wherein a pricing schedule provides for a price reduction for the information when offered for sale, the price reduction increasing as fees increase for intermediation services provided to a party purchasing the information for transactions in one of the first and second sectors.

60. The system of claim 53, wherein
the information includes a lowest interest rate offered by any lender to an applicant for the financial products meeting a profile specified by a party purchasing the information.

61. The system of claim 53, wherein
the information includes a volume of loan applications meeting a profile specified by a party purchasing the information.

62. The system of claim 53, wherein
the information includes a statistical characterization meeting a profile specified by a party purchasing the information.

63. The system of claim 53, wherein
the information includes a statistical characterization of traded pools of the financial products, the pools meeting a profile specified by a party purchasing the information.

64. The apparatus of claim 53, wherein the first sector is origination of insurance.

65. Apparatus comprising:
a data processing system having a program executing computer, a data storage device, and an output device and one or more programs to provide financial transaction data processing functions involving at least one of lending/loan trading, offering lines of credit/lines of credit trading and insurance/reinsurance;
said data processing system including programs executing on said program executing computer that record credits for transaction fees paid by a party for transactions in a first sector for redemption against fees payable by the party for transactions in a second sector, the first and second sectors respectively being origination and secondary trading of products of a class of financial products in which transactions for the products occur among market participants in the first sector, distinctly, and second sector, distinctly.

66. Apparatus comprising:
a data processing system having a program executing computer, a data storage device, and an output device and one or more programs to provide data processing for transactions in a class of financial products in distinct first and second sectors, the first and second sectors respectively being origination and secondary trading of products of the class among market participants, said transactions involving at least one of lending/loan trading, offering lines of credit/lines of credit trading and insurance/reinsurance and said data processing system including programs executing on said program executing computer that provide access to information to parties conducting transactions in the second sector and record charges for the access, the information being captured in providing financial transaction services in the first sector and offered under a pricing schedule providing price reductions for the information as fees increase for the services provided for transactions in the first sector.

67. A method comprising:

receiving lending criteria data records from a plurality of lenders at a data processing system having a program executing computer, a data storage device, and an output device and storing the lending criteria data records in said data storage device;

executing computer programs on said data processing system for:

compiling a first set of statistics in said data processing system based on said lending criteria from each of said plurality of lenders;

calculating a measure of fees earned with respect to a selected lender;

outputting from said data processing system said first set of statistics to a selected lender; and calculating a price for outputting said first set of statistics to said selected lender that is based on said measure of fees earned with respect to said selected lender.

68. The method of claim 67 wherein said price decreases as said measure of fees increases.

69. The method of claim 67 further comprising:

receiving at said data processing system a loan solicitation from each of a plurality of loan seekers;

compiling a second set of statistics in said data processing system based on said loan solicitations from each of said loan seekers; and outputting from said data processing system said second set of statistics to said selected lender.

70. The method of claim 67 further comprising the steps of:

outputting from said data processing system said first set of statistics to a loan pool trader; and receiving at said data processing system from said loan pool trader a bid to buy loans.

71. The method of claim 67 further comprising:

outputting from said data processing system said first set of statistics to a loan pool trader; and receiving at said data processing system from said loan pool trader an offer to sell loans.

72. The method of claim 67 further comprising:

compiling a second set of statistics in said data processing system based on underwriting standards from each of a plurality of loan pool traders;

outputting from said data processing system said second set of statistics to a loan pool trader; and receiving at said data processing system from said loan pool trader an offer to sell loans.

73. The method of claim 67 further comprising the step of outputting from said data processing system an indicium that a portion of said measure of fees is to be remitted to said selected lender.

74. The method of claim 73 wherein said fees are earned from said selected lender within a given interval.

75. The method of claim 67 further comprising the steps of:

calculating fees incurred by said selected lender for secondary trading of loans;

crediting a portion of said measure of fees against said fees incurred by said selected lender for secondary trading of loans;

outputting from said data processing system an indicium that said portion of said measure of fees is to be credited against said fees incurred by said selected lender for secondary trading of loans.

76. The method of claim 75 wherein said fees are earned from said selected lender within a given interval.

77. A method comprising:

receiving one or more of (1) lending criteria data records from a plurality of lenders and (2) applicant qualification data records from a plurality of lenders at a data processing system having a program executing computer, a data storage device, and an output device and storing the lending criteria data records in said data storage device;

executing computer programs on said data processing system for:

compiling statistics in said data processing system based on one or more of (1) said lending criteria from each of said plurality of lenders and (2) said information relating to the qualifications of applicants relative to the lending criteria of a plurality of lenders;

calculating a first measure of fees payable by a selected lender in connection with intermediation of lending transactions;

generating a pricing schedule, the pricing schedule providing credits for said first measure of fees, which are applied to a measure of fees payable by the selected lender in connection with secondary trading of financial products, or which are applied to a measure of fees payable by the selected lender in connection with outputting said statistics to the selected lender.

78. The method of claim 77 wherein said pricing schedule provides a decrease in the measure of fees, payable by the selected lender in connection with secondary trading of financial products, or which are applied to a measure of fees payable by the selected lender in connection with outputting said statistics to the selected lender, decreases as said first measure of fees increases.

79. The method of claim 77 further comprising the step of outputting from said data processing system an indicium that a portion of said measure of fees is to be remitted to said selected lender.

80. The method of claim 77 wherein said fees are earned from said selected lender within a given interval.

81. The method of claim 77 further comprising the steps of:

calculating fees incurred by said selected lender for secondary trading of loans;

crediting a portion of said first measure of fees against said fees incurred by said selected lender for secondary trading of loans;

outputting from said data processing system an indicium that said portion of said first measure of fees is to be credited against said fees incurred by said selected lender for secondary trading of loans.

82. The method of claim 77 further comprising:

receiving at said data processing system a loan solicitation from each of a plurality of loan seekers;

compiling a second set of statistics in said data processing system based on said loan solicitations from each of said loan seekers; and generating and outputting from said data processing system said second set of statistics to said selected lender.

83. The method of claim 77 further comprising the steps of:
generating and outputting from said data processing system said statistics to a loan pool trader; and
receiving at said data processing system from said loan pool trader a bid to buy loans.

84. The method of claim 77 further comprising:
outputting from said data processing system said statistics to a loan pool trader; and
receiving at said data processing system from said loan pool trader an offer to sell loans.

85. The method of claim 77 further comprising:
compiling a second set of statistics in said data processing system based on underwriting standards from each of a plurality of loan pool traders;
outputting from said data processing system said second set of statistics to a loan pool trader; and
receiving at said data processing system from said loan pool trader an offer to sell loans.

* * * * *